United States Patent [19]

Robins

[11] Patent Number: 5,392,428
[45] Date of Patent: Feb. 21, 1995

[54] TEXT ANALYSIS SYSTEM

[76] Inventor: Stanford K. Robins, 1309 Knollwood La., Mendota Heights, Minn. 55118

[21] Appl. No.: 217,136

[22] Filed: Mar. 23, 1994

Related U.S. Application Data

[63] Continuation of Ser. No. 732,823, Jul. 19, 1991, abandoned, which is a continuation-in-part of Ser. No. 722,856, Jun. 28, 1991, abandoned.

[51] Int. Cl.$^6$ .................................... G06F 15/401
[52] U.S. Cl. ............................. 395/600; 364/419.14; 364/DIG. 1; 364/283.4
[58] Field of Search ............... 364/419.01–419.2, 364/DIG. 1, DIG. 2; 395/600, 650, 700

[56] References Cited

U.S. PATENT DOCUMENTS

| | | |
|---|---|---|
| 3,670,310 | 6/1972 | Bharwani et al. |
| 4,959,769 | 9/1990 | Cooper et al. ............... 364/DIG. 1 |
| 5,062,074 | 10/1991 | Kleinberger . |
| 5,148,366 | 9/1992 | Buchanan et al. ............. 395/600 X |
| 5,157,783 | 10/1992 | Anderson et al. . |
| 5,267,155 | 11/1993 | Buchanan et al. ............. 364/419.14 |

OTHER PUBLICATIONS

David Blair and M. E. Maron, "An Evaluation of Retrieval Effectiveness for a Full-Text Document Retrieval System, *Communications of the Association of Computing Machinery*", XXVIII (1985) 289.
Robert C. Berring, "Full-Text Databases and Legal Research: Backing Into the Future", *High Technology Law Journal*, I (1986) 27, 43 et seq.
"Discovery", *American Bar Association Legal Technology Advisory Council Software Review*, 3.1 (1988).
"Discovery-ZX and Cat-Links: Organizing Your Depositions", *Law Office Technology Review*, vol. 1, No. 6, Apr. 1990, p. 1.
Benjamin H. Cohen, Barry D. Bayer, Mark Welch, "Summation II Useful for Litigation Support", *Massachusetts Lawyers Weekly*, vol. 19, Sep. 24, 1990, p. 32.
Benjamin H. Cohen and Barry D. Bayer, "A Macintosh Program to Help You Get Ready for Trial", *Law Office Technology Review*, (Jun. 1991).
"Ready for Trial! ® and DiscoveryZX TM Comparison of Major Features", pp. 1-3.
Keith Oratz and Hank Palczewski, "Automated Litigation Support", *Automation in the Law Office*, May, pp. 28-30.
Bank of Zama v. Richardson, "Best Evidence" Deposition Summary vol. 6014, Dec. 14, 1988, pp. 10, 13, 23.
"Co-Counsel III TM, The Next Generation in Litigation Support", CompuLaw, Ltd. brochure.
J. Gregory Wallace, "Folio VIEWS Revisited: Designing Your Own Legal Infobase", *The Lawyer's PC* ®, Jul. 1, 1991, pp. 1-6.
J. Gregory Wallace, "Folio VIEWS Revisited: Designing Your Own Legal Infobase, Part Two", *The Lawyer's PC* ®, Jul. 15, 1991, pp. 1-7.
"The Litigator's ToolBox TM, A Total PC-Based Litigation Support System Featuring IpsoFacto TM ", brochure produced by Basic Systems Application and Signum Microsystems, Inc.
"Victory Full Text for Litigation Support", brochure by BCSI, Inc., Phoenix, Ariz.
"Depo-Disk TM Highlights", brochure by NRA Litigation Support Products, St. Paul, Minn.
"Sonar Professional High-Speed Text Retrieval", brochure by Virginia Systems, Midlothian, Va.

*Primary Examiner*—Thomas M. Heckler
*Attorney, Agent, or Firm*—Merchant, Gould, Smith, Edell, Welter & Schmidt

[57] ABSTRACT

A computer-based system for analyzing textual works is achieved by operating on a model of the text as stored in a relational database. The text is divided into user-defined segments, and the system maintains a series of records, each of which characterizes a segment of the text. The system generates a one-to-one association between each record and the indicia which indicate the length of the record and correspond to the beginning and end points of text segments. The system also includes topic records which maintain a list of topics. The system generates one-to-many associations between topics and records so that a link is established between a particular topic and one or more records. Based on the model, the system manages the text and generates reports for analysis of the text.

36 Claims, 25 Drawing Sheets

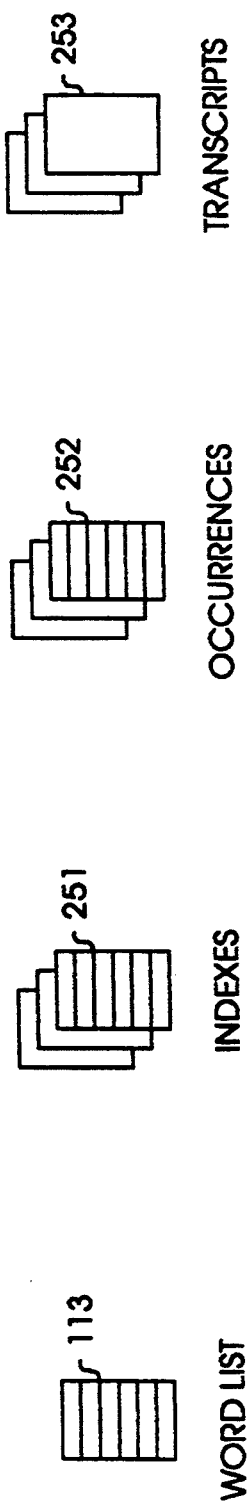

```
┌─────────────────────────────────────────────────┐
│ ▪  Quincey vs. GuardASuit  Quincey, Jamie 9/15/87 │ — 174
├─────────────────────────────────────────────────┤
│ 22  Q:  Did she treat you for burns or for the neuritis or │
│ 23      for both?                               │
│ 24  A:  Both.                                   │
│ 25  Q:  Where does Dr. Formento have her practice, if │
│  1      you know?                               │
│  2  A:  On Sauerbruch Drive in Farmingham.     │
│  3  Q:  Were you sent to some other place for follow up │
│  4      and therapy?                            │
│  5  A:  Yes. I saw Dr. Jean DeWitt, who was a burn │
│  6      specialist and was called in as a consultant by Dr. │
│  7      Formento.                               │
│  8  Q:  Is he located at the same address?     │
│  9  A:  No, his office is on Barnard Close in Farmingham. │
│ 10  Q:  Where did you actually get the garment that you │
│ 11      were wearing?                           │
│ 12  A:  From the company stockroom.            │
│ 13  Q:  Would someone give it to you, or would you just │
│ 14      go there on your own to a big box and pick them up │
│ 15      yourself?                               │
│ 16  A:  Someone attending the stockroom would give it to │
│ 17      me.                                     │
│ 18  Q:  Do you know who?                       │
│ 19  A:  No, I don't.             207   205     │
│ 20  Q:  Who was in charge of the stockroom at that time? │
│ 21  A:  I don't know.                           │
│ 22      Q: Would you wear the same garment for more than a │
│    176                                 178  180│
└─────────────────────────────────────────────────┘ — 173
 Current: [>>] From: [19] [10]  (Previous) (Comments..) (When...) — 179
  19:10         [✓]
  177—[>>] To:  [20] [24]  (Next)  (Exhibits..) (Ranges...) — 195

Topic:
┌──────────────────────────────────┬──────────────────────────────┐
│ He got the garment he was wearing from the │ ✓ 1  Cause of Accident/Injury │ — 175
│ company stock room. The garment was given to him │   2  Defendant: Failure to instruct/warn │
│ by someone who was attending the stock room. He │   3  Extent of Injury/Amount of Damages │
│ does not know who it was.    206 │ ✓ 4  Floatum: Contributory Negligence │
│                                  │ ✓ 5  Garment: Defects/suitability │
│ He would get a new garment at the start of each │   6  General Circumstances │
│ shift and discard it at the end of the shift. It was in │   7  Plaintiff: Contributory Negligence │
│ his own discretion as to whether to get another │   8  Preliminaries │
│ garment if he had a hole in the garment. He did not │   9  Static Electricity │
│ get a different garment that day because it was │  10  Other                │
│ covering everything all right except for the hole. │                              │
│                                  │                              │
│ He did not ever wear a protective garment when he │                              │
│ was a HiLo operator. Other than the plastic apron │                              │
│ and the suit, there were no other types of │                              │
│ protective garment in use at the plant. │                              │
└──────────────────────────────────┴──────────────────────────────┘
   170            171              172
```

FIG. 20

| | Full Text Search | |
|---|---|---|
| What? ⌘1 | ACETONE w/in 5 of FLAM | Search |
| Where? ⌘2 Show: 50 Lines | Remove ⌘R  Report... | Done |

| | What | Matter | Date | Page:line |
|---|---|---|---|---|
| 2 | ACETONE w/in 5 of FLAME | Lister, Dr. Pat | 6/9/87 | 22:22 |
| 3 | ACETONE w/in 5 of FLAME | Lister, Dr. Pat | 6/9/87 | 23:1 |
| 4 | ACETONE w/in 5 of FLAME | Lister, Dr. Pat | 6/9/87 | 23:4 |
| 5 | ACETONE w/in 5 of FLAME-PROOFED | Lister, Dr. Pat | 6/9/87 | 34:1 |
| 6 | ACETONE w/in 5 of FLAMES | Lister, Dr. Pat | 6/9/87 | 36:1 |
| 7 | ACETONE w/in 5 of FLAMES | Quincey, Jamie | 9/15/87 | 26:1 |
| 8 | ACETONE w/in 5 of FLAMES | Quincey, Jamie | 9/15/87 | 26:3 |
| 9 | ACETONE w/in 5 of FLAMMABLE | Lister, Dr. Pat | 6/9/87 | 20:6 |
| 10 | ACETONE w/in 5 of FLAMMABLE | Lister, Dr. Pat | 6/9/87 | 20:11 |
| 11 | ACETONE w/in 5 of FLAMMABLE | Lister, Dr. Pat | 6/9/87 | 22:18 |
| 12 | ACETONE w/in 5 of FLAMMABLE | Lister, Dr. Pat | 6/9/87 | 22:22 |
| 13 | ACETONE w/in 5 of FLAMMABLE | Lister, Dr. Pat | 6/9/87 | 23:1 |
| 14 | ACETONE w/in 5 of FLAMMABLE | Lister, Dr. Pat | 6/9/87 | 23:4 |
| 15 | ACETONE w/in 5 of FLAMMABLE | Lister, Dr. Pat | 6/9/87 | 33:14 |
| 16 | ACETONE w/in 5 of FLAMMABLE | Lister, Dr. Pat | 6/9/87 | 36:24 |
| 17 | ACETONE w/in 5 of FLAMMABLE | Quincey, Jamie | 9/15/87 | 12:17 |
| 18 | ACETONE w/in 5 of FLAMMABLE | Quincey, Jamie | 9/15/87 | 12:18 |

No. 1 of 24   [ First Word ]  [ Second Word ]

| 17 | the task and to comment on the fact that both |
| 18 | workers and management should have been made |

| 20 | because the interaction of the two in the manner |
| 21 | that  in the way that happened here is |

| 23 | proof. |
| 24 | Q: Then the next sentence says, such cleaning |
| 25 | should have been done in a well humidified area |

Page: 21
| 1 | as a minimum requirement, is that correct? |
| 2 | A: Yes. |
| 3 | Q: Was it your understanding that it was a |

FIG. 21

Ready For Trial® Report Selection

Matter date: 240
- Lister, Dr. Pat  6/9/87
- Quincey, Jamie  9/15/87  9/16/87

☐ Use less paper   ☒ Include work product notice
☐ Print tab #'s starting with: 1  — 241

All Subjects/All Exhibits

Format:  ◉ Digest text
         ○ Actual transcript text
         ○ Q/A paragraphs
☒ Print topic Which parts of the report would you like included?
☒ Print page ranges in order with exhibit references and comments
☒ Print exhibits with descriptions
☒ Print page ranges by subject with exhibit references and comments Check all
Uncheck all — 235

Page setup...   ☒ Preview   Print   Cancel

TEXT ANALYSIS SYSTEM

This is a continuation of application Ser. No. 07/732,823, filed Jul. 19, 1991, abandoned, which is a continuation-in-part of application Ser. No. 07/722,856, filed Jun. 28, 1991, now abandoned.

FIELD OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates to a data processing system for the analysis of textual works. The present invention is particularly useful for, but not limited to, analyzing and managing transcripts of depositions and court proceedings, and items referenced in those transcripts.

BACKGROUND OF THE INVENTION

One of the primary methods of gathering evidence in litigation is through the use of depositions. A deposition is a witness' testimony under oath and is typically recorded in a transcript by a court reporter. The deposition transcript is read and analyzed by those in the legal profession to assist in the litigation process and prepare for a trial. During a trial, the testimony of multiple witnesses may be recorded in a trial transcript of the court proceedings. This trial transcript may then be read and analyzed by lawyers to prepare for post-trial motions or an appeal.

There are a number of available systems which attempt to assist lawyers, and others in the legal profession, with the analysis and management of deposition and trial transcripts. A typical system will allow full-text searching, meaning that a user may search all words in a transcript for any locations of a particular word. This is accomplished either by a brute force method of searching the transcript word by word or with the use of an index of all words in the transcript.

However, full-text searching, or searching through raw text, is of limited effectiveness in retrieving relevant and useful information from a database. Therefore, when a database merely consists of the raw text of a transcript, the computer-based system interacting with the database is not using the full power of the computer. This type of system is thus of only limited use in assisting the lawyer with the analysis of a transcript or other document.

Full-text searching has at least the following limitations which may affect the analysis of text. Most words have synonyms or near-synonyms that a user may not realize are used in the text. Since full-text searching only searches for the exact character string entered by a user, it will not locate any synonyms and relevant information could be missed. This same limitation is present in the case of misspellings of a word or even correct variations in the spelling of a word. Some systems attempt to allow for this situation by providing the capability of multiple queries or searching for a partial word (wildcard search). A partial word search allows a system to search for all occurrences of words that begin with a particular character string (root). Even with partial word searches, however, there are limitations because a partial word search usually generates irrelevant occurrences of all words of which the search characters are the root. Finally, full-text searching tends to recall only a small fraction of relevant information in the text and usually also recalls much irrelevant information.

Other systems allow the user to perform what is known in the industry as issue coding. As the user works through the transcript, the user may assign codes to certain portions of the transcript, and each unique code represents an issue of fact or law. Issue codes are typically used because a witness will typically not use the actual words of the issue in their testimony. For example, in a personal injury suit, one of the issues may be contributory negligence. The witness will never actually say "contributory negligence," but the witness' testimony may be relevant to that issue and thus provide support necessary to prove that issue.

In order to provide for this situation, a system may allow the user to assign a certain code to each portion of the transcript that relates to an issue such as contributory negligence. In such a system, the user could assign a "contributory negligence" code at every place in the transcript that the user believes is relevant to that issue. The system may then search the transcript for each of these issue codes and report the occurrences of an issue code. This type of system is also of limited effectiveness in managing a text database. There are no associations between an issue code assigned to one part of a transcript and the same issue code assigned to another part of the transcript. Changing an issue code at one location in the transcript will have no effect on the same issue code at other locations in the text. These issue codes are simply like another word in the text, and searching for issue codes is similar to full-text searching. The limitations of full-text searching are again present in issue coding.

Other systems also have limitations in the ability to manage exhibits or items referenced in the text. These systems typically handle exhibits by having the user enter words into the text, similar to issue codes, in order to identify the location of a reference to an item. This type of system does not have the ability to, for example, track exhibits across multiple transcripts. Therefore, with this type of system, there is no correlation between an exhibit referenced in one transcript and the same exhibit referenced in another transcript. The management of exhibits is also limited in full-text searching. Full-text searching does not have the ability to reference items external to the text such as exhibits, or non-text items in the text such as graphs or diagrams.

There is thus a need for a complex and sophisticated system for managing and analyzing the text contained in a document. For example, there is a need for this type of system in the legal profession in order to have a more powerful tool for analyzing transcripts and assisting in litigation.

SUMMARY OF THE INVENTION

The present invention solves these and other shortcomings of the prior art described above. The present invention also solves other shortcomings of the prior art which will become apparent to those skilled in the art upon reading and understanding the present specification.

The present invention is a computer-based system for analyzing textual works by operating on a model of the text as stored in a relational database. The text is divided into user-defined segments, and the system maintains a series of records, each of which characterizes a segment of the text. The system generates a one-to-one association between each record and indicia which indicate the length of the record and correspond to the beginning and end points of text segments.

The system also includes topic records which maintain a list of topics. The system generates one-to-many associations between topics and records so that a link is established between a particular topic and one or more records.

The system manages the text and generates reports of the data contained in the records and the relationships between the records and associated data for analysis of the text based on the model in the relational database. As further explained in the present specification, the use of a model of the text facilitates management of the text and provides for powerful and versatile reporting functions in the present invention.

In the preferred embodiment, the system may further include exhibit records which maintain a list of items referenced in the text. Such a system generates one-to-many associations between items and records so that a link is established between a particular item and one or more records. The preferred system is further enhanced by creating one-to-one associations between records and annotations to the text, synopses characterizing the text, and chronological information such as dates and times.

BRIEF DESCRIPTION OF THE DRAWINGS

In the drawings where like numerals refer to like components throughout several views.

FIG. 2C is a chart of the files contained within the preferred database compatible with the present invention for indexing documents.

FIG. 14 represents a preferred user interface for inputting exhibit depictors into exhibit records.

FIG. 16 represents a preferred user interface for creating records in the Digest Records File and associating the records in the Digest Records File with other records.

FIG. 20 represents a preferred method of reporting a full-text search.

FIG. 21 represents a preferred user interface for structuring a report.

DETAILED DESCRIPTION OF THE PREFERRED EMBODIMENT

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

I. INTRODUCTION

The preferred system utilizes a relational database to construct an analog or model of a textual work such as a deposition transcript. By using a model, the present system has much versatility and power in the analysis and management of the database. A model allows, among other things, cross-referencing of different files in the database for sorting and searching capabilities which assist in the analysis of the information stored in the database. For example, a user may track deposition exhibits across multiple transcripts because a file in the model cross-references each deposition exhibit with the location in the text where the exhibit is referenced. Another file in the preferred model cross-references topics with corresponding locations in the source text, i.e. the text to be analyzed, which discuss this topic. This allows sorting and searching by a particular topic or multiple topics.

When the source text is deposition transcripts, searching and sorting by topics is a powerful tool for a litigator in assessing the testimony of witnesses. The preferred embodiment describes a system for analyzing source text including transcripts of depositions or court proceedings. One skilled in the art will recognize that the present invention may be used for analyzing any type of textual work, which may include, for example, multivolume periodicals, books, and scientific research reports.

Figure 3:
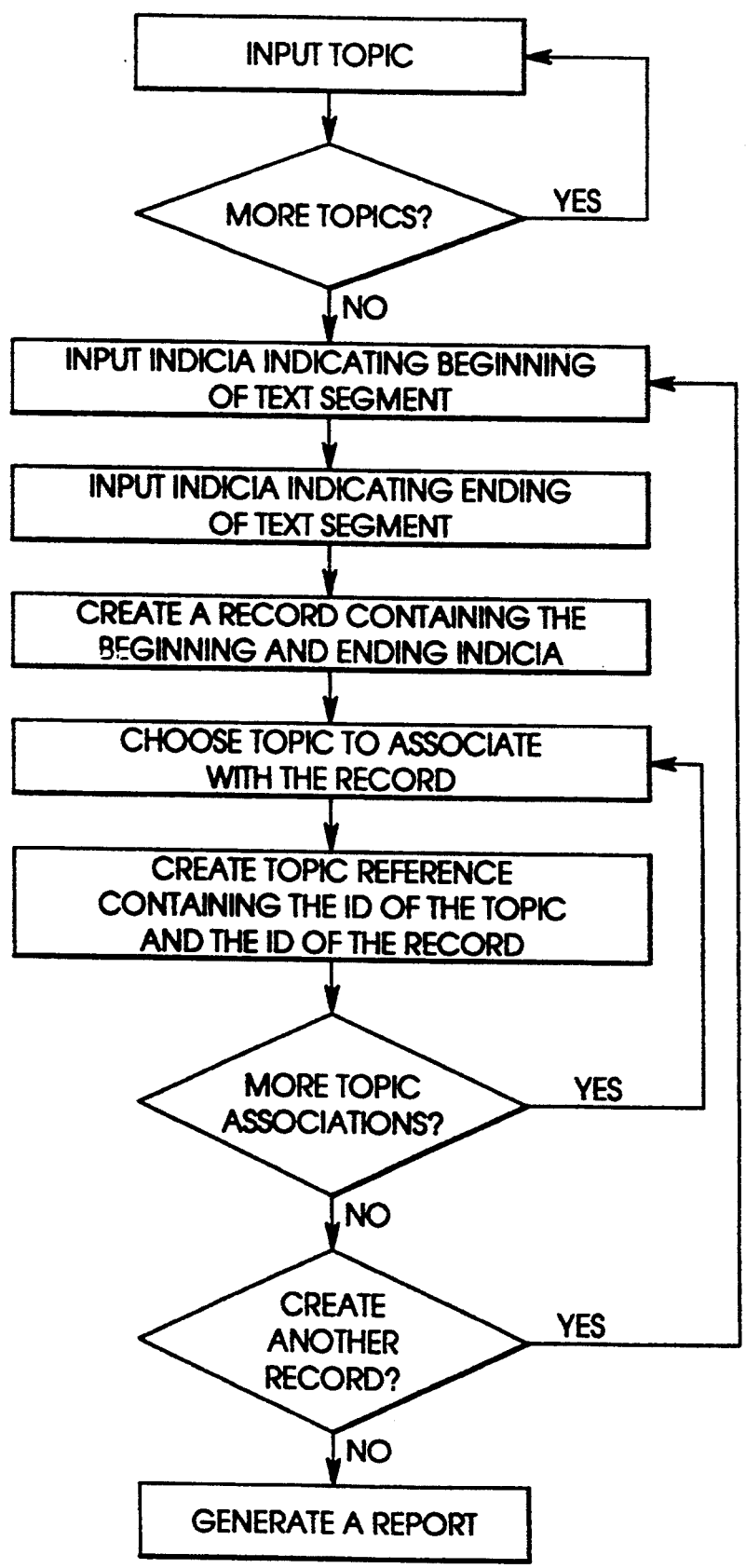
FIG. 3 represents a preferred flow of data through the disclosed text management and analysis system.

The preferred embodiment contains certain fundamental functions, the preferred data flow of which is shown in FIG. 3. The preferred system allows the user to enter topics and other information. The preferred system allows a the user to create records by dividing the source text so that each record contains data which characterizes a segment of the source text. Each record also contains indicia which represent the beginning and the end of each record. The preferred system creates one-to-one associations between each record and the corresponding indicia so that only one record relates to each indicia. The user may relate topics or subjects to records in order to further characterize the data contained within the record. The preferred system creates one-to-many associations between each topic and the corresponding records so that each topic may relate to many different records. Finally, the preferred system has the capability to generate reports of the data contained within the records and the relationships between data fields. The result is a model of source text in database format which may comprise segments of source text represented in database records, enhanced by the capability of the user to retrieve, among other things, topic relationships, synopses, annotations, item reference relationships, and chronological relationships.

The preferred embodiment operates in a Pascal environment on a Macintosh hardware platform. One skilled in the art will recognize that other programming or hardware environments may be used without departing from the scope of the invention.

II. DATABASE STRUCTURE OF A MODEL

FIG. 1 is a map of the preferred relational database structure which forms the basis for the model. One skilled in the art will recognize the utility of such a database map in understanding the disclosed system. The boxes on the map represent database files, each file comprising a series of records. Each record contains one or more fields, and the letters on the right side of the records shown identify the data type of the corresponding field. Preferred data types may be defined as shown in Table 1.

TABLE 1

| DATA TYPE | MEANING |
| --- | --- |
| A | Alpha (fixed length character string). |
| B | Boolean. |
| D | Date. |
| H | Time. |
| I | Integer (2 bytes). |
| L | Long integer (4 bytes). |
| T | Text of any length. |

© 1991 Robins Analytics, Inc.

Figure 1A:
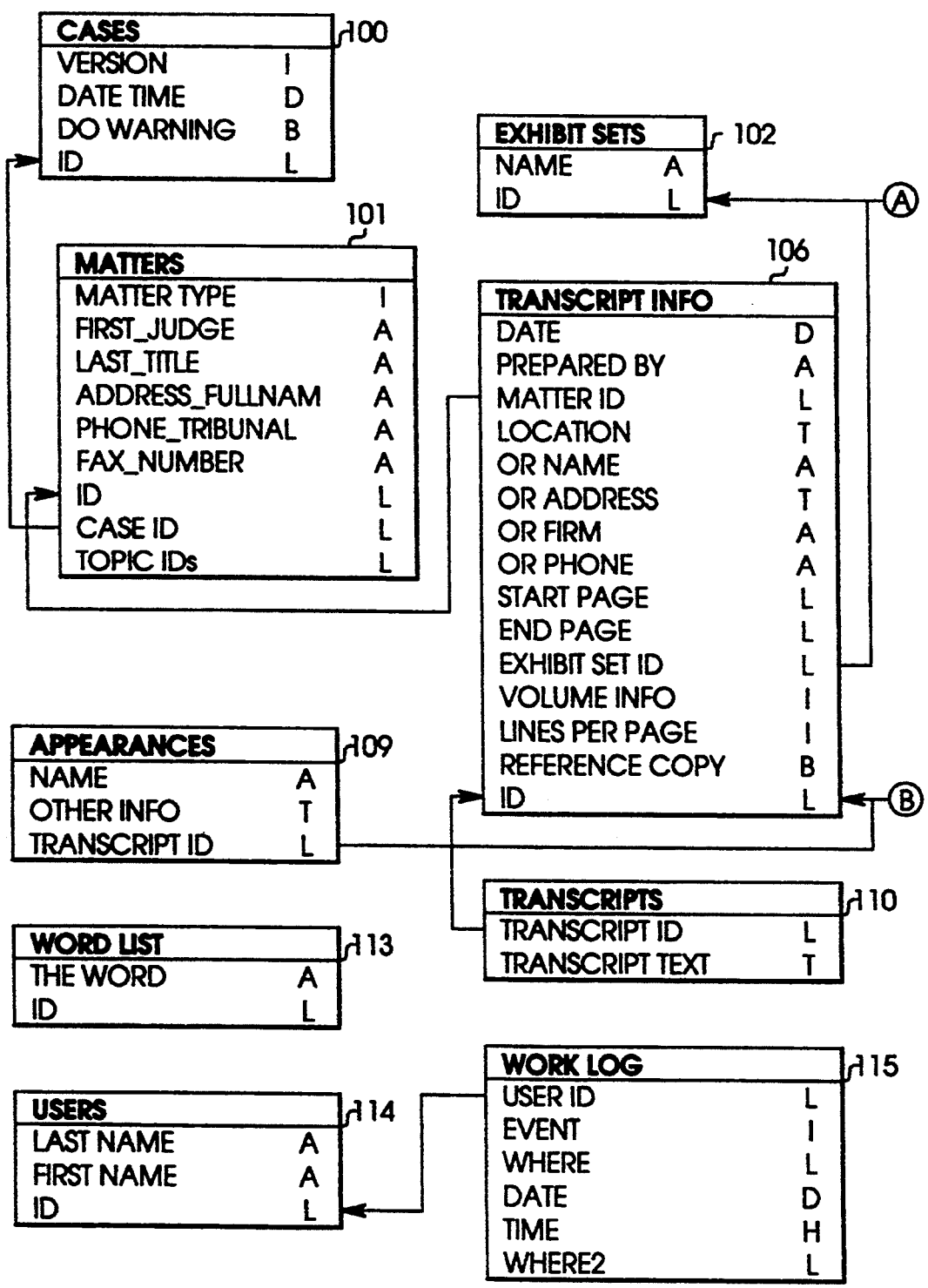
FIGS. 1A and 1B are a map of a preferred database structure of the present invention, showing the relationships of the various files.
Figure 1B:
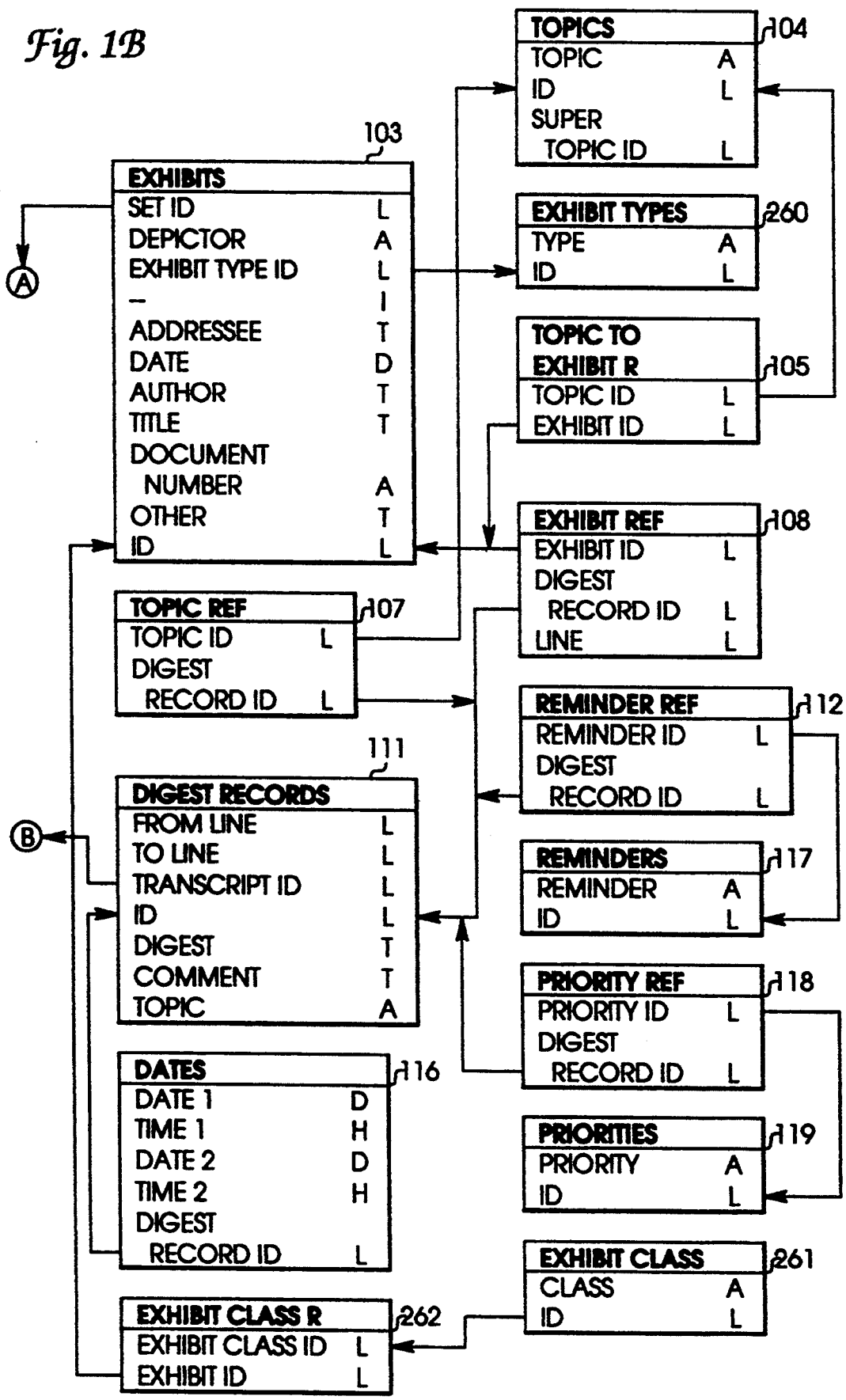
Figure 2A:
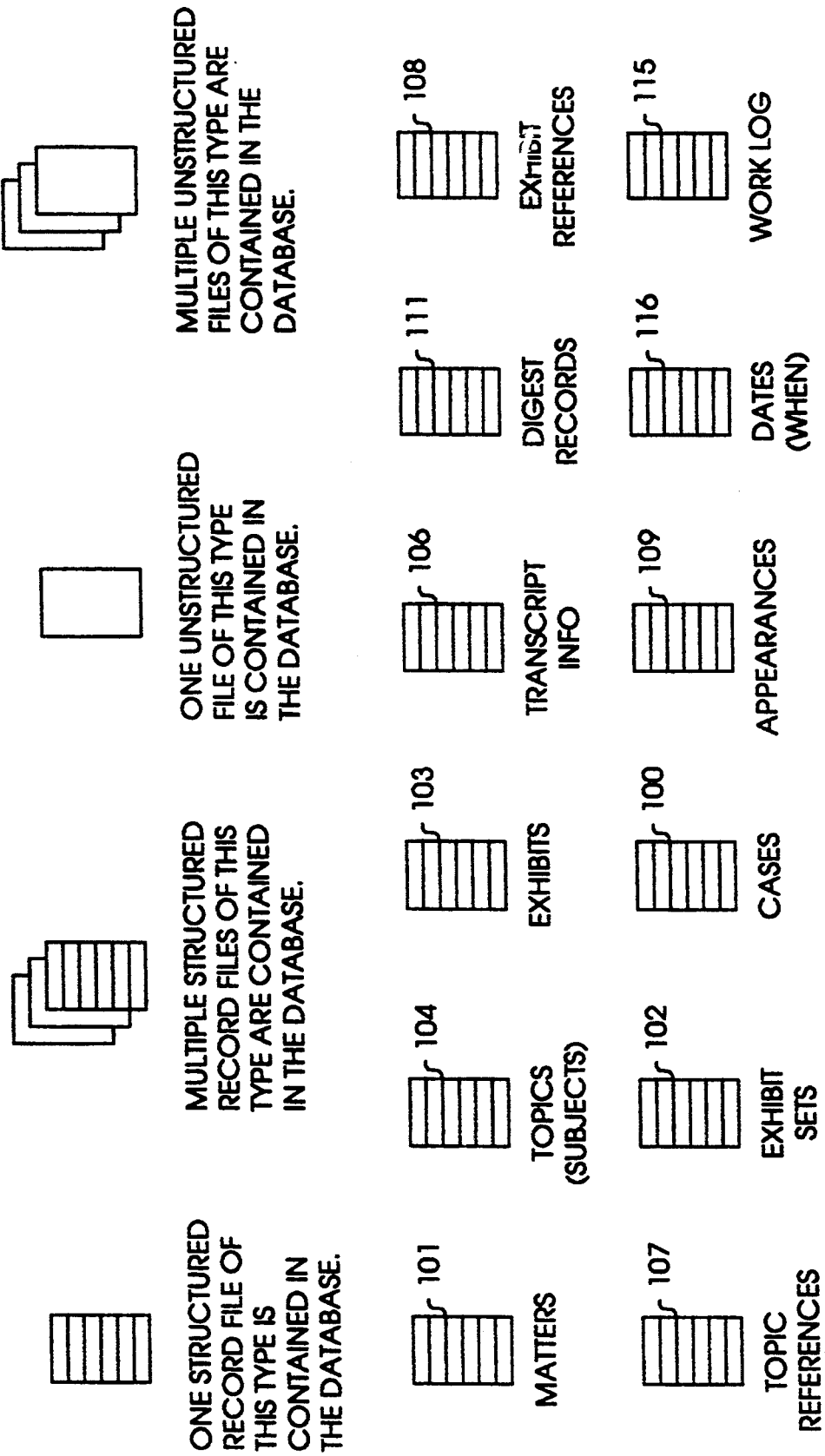
FIGS. 2A and 2B are a chart of the various files contained within a preferred database compatible with the present invention.
Figure 2B:
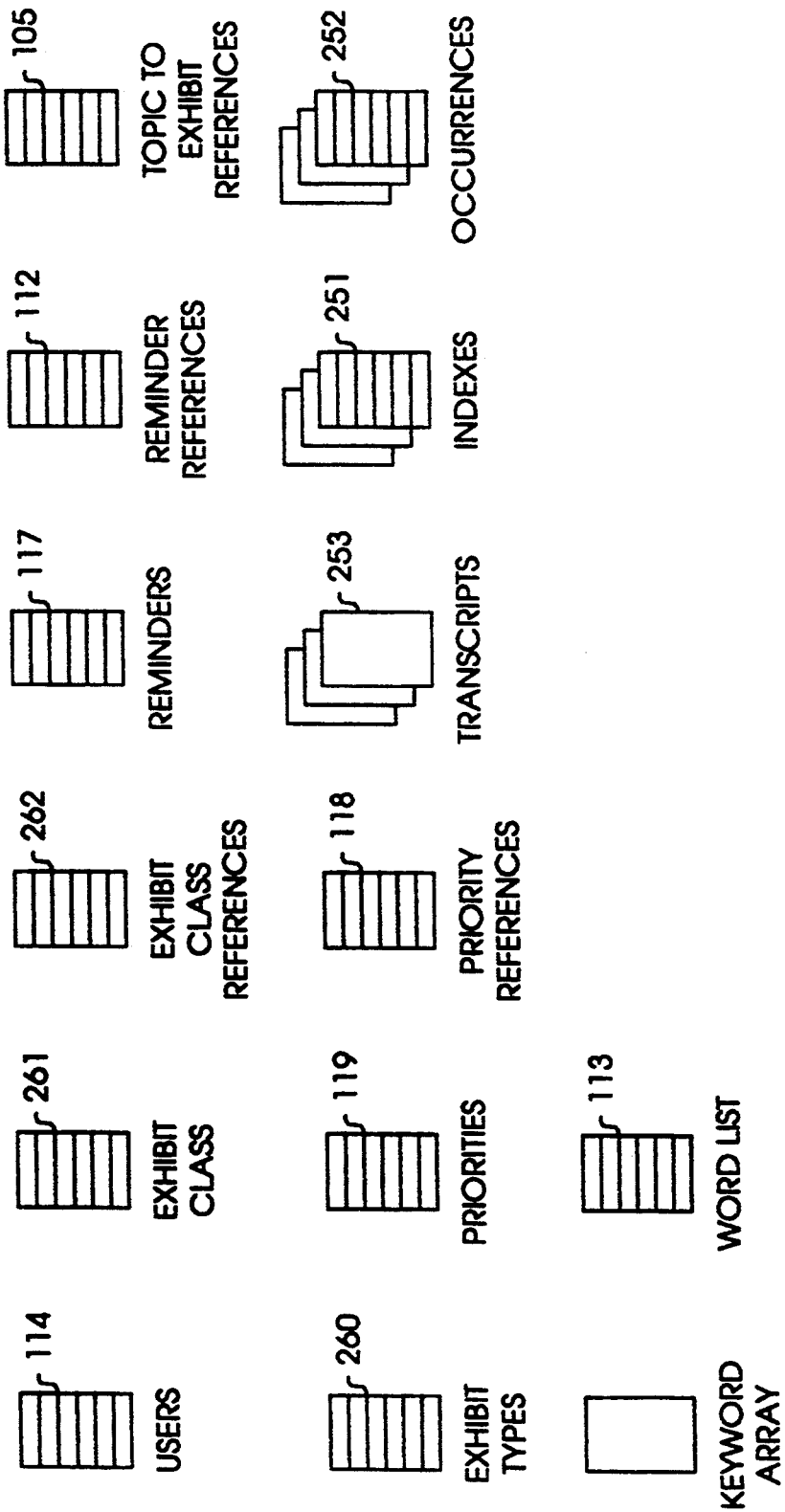

The lines between the boxes of FIGS. 1A and 1B represent the relationships between the files. FIGS. 2A–2C show the structure of the individual files in the database map of FIGS. 1A and 1B.

The set of all the files shown in FIGS. 1A, 1B, and 2A–2C constitutes one model. The present system may create additional models utilizing another set of identical files. Therefore, the present invention may be used, for example, for analyzing deposition transcripts from many different litigation cases.

A. Case Information

The files discussed in the text following immediately below typically contain information which characterizes identifying features of the text, as opposed to the content of the text. The information contained within these files is preferably used as a reference for all other files in the database map so that the system can associate information in the other files of a model with a particular body of source text.

1. Cases File

The Cases File 100 contains the identification of one case, such as one litigation case. One case file may contain multiple transcripts. The fields of each record in the Cases File 100 may be defined as shown in Table 2.

TABLE 2

| FIELD | MEANING |
| --- | --- |
| version | Version of the system operating on this model. |
| dateTime | Date and time when this version was created. |
| doWarning | If the user wants the system to display a warning (such as a protective order) before entering data files. |
| ID | Identification number for this record. |

© 1991 Robins Analytics, Inc

2. Matters File

The Matters File 101 contains information which identifies a body of source text for a particular witness or court proceeding. For example, the model may contain one Matters File for each witness in a litigation case. The fields of each record in the Matters File 101 may be defined as shown in Table 3.

TABLE 3

| FIELD | MEANING |
| --- | --- |
| matterType | Number indicating witness or proceeding. |
| first_Judge | First name of the witness or, for court proceedings such as a trial or motion hearing, name of the judge. |
| last_title | Last name of the witness, or title of the proceeding. |
| address_fullnam | Witness' address, or full name of the proceeding. |
| phone_tribunal | Witness' phone number, or tribunal of the proceeding. |
| fax_number | Witness' fax number, or tribunal file number for proceeding. |
| ID | Identification number for this record. |
| caseID | Identification number of the corresponding record in the Cases File 100. |
| topicIds | Array of Identification numbers for all topics considered for this transcript. |

© 1991 Robins Analytics, Inc.

3. Transcript Information File

The Transcript Information File 106 typically contains identification information for the transcripts of each of the witnesses or proceedings of the Matters File 101. For example, the Matters File 101 may contain one record for a particular witness who was deposed on several different days. The Transcript Information File 106 normally would have a different record for the transcript of the witness' testimony for each of those days. While there is preferably only one record in the Matters File 101 for each witness or proceeding, that record may be linked to several records in the Transcript Information File 106. The fields of each record in the Transcript Information File 106 may be defined as shown in Table 4.

TABLE 4

| FIELD | MEANING |
|---|---|
| date | Date of the deposition or court proceeding. |
| preparedBy | Optional name of the person who is analyzing the transcript. |
| matterID | Identification number of the corresponding witness' or proceeding's record in the Matters File 101. |
| location | Address where the deposition or proceeding occurred. |
| crName | Name of the court reporter who recorded the testimony in the transcript. |
| crAddress | Court reporter's address. |
| crFirm | Court reporter's employer. |
| crPhone | Court reporter's phone number. |
| startPage | First page number of the testimony in the transcript. |
| endPage | Last page number of the testimony in the transcript. |
| exhibitSetID | Identification number of the corresponding exhibit set record for this transcript in the Exhibits File 103. |
| volumeinfo | Volume number (for multi-volume transcripts). |
| linesPerPage | Number of lines of testimony per page in the transcript. |
| referenceCopy | Whether it is a reference copy (if a reference copy was generated in order to convert the ASCII file from the court reporter). |
| ID | Identification number for this record. |

© 1991 Robins Analytics, Inc.

4. Appearances File

The Appearances File 109 typically contains additional information on each of the transcripts identified in the records of the Transcript Information File 106. Appearances typically means the attorneys present at the deposition or court proceeding. The appearances information preferably is linked to the record of the corresponding transcript in the Transcript Information File 106. The fields of each record in the Appearances File 109 may be defined as shown in Table 5.

TABLE 5

| FIELD | MEANING |
|---|---|
| name | Name of the attorney/representative. |
| otherInfo | User-defined textual data. |
| transcriptID | Identification number of the corresponding record in the Transcript Information File 106. |

© 1991 Robins Analytics, Inc.

B. Digest Records File

The Digest Records File 111 typically contains one or more records for each transcript, and the information in the fields of a particular source text's records characterizes the content of the source text. The user establishes the length of each record, and each record may have a different user-defined length as desired. Each record contains data which identifies the locations in the source text which correspond to the beginning and end points of a record.

If the source text is a deposition transcript, for example, the records corresponding to this transcript will contain information entered by the user which charac-terizes the witness' testimony. By using the Digest Records File 111 in conjunction with other files, the system may manipulate the data in the model to assist the user in analyzing the witness' testimony. These capabilities will be explained in more detail below.

The fields of each record in the Digest Records File 111 may be defined as shown in Table 6.

TABLE 6

| FIELD | MEANING |
|---|---|
| fromLine | Line number which corresponds to the beginning of this segment of text in the transcript. |
| toLine | Line number which corresponds to the end of this segment of text in the transcript. |
| transcriptID | Identification number of the corresponding record for this transcript in the Transcript Information File 106. |
| ID | Identification number for this record. |
| digest | Summary of the testimony within the beginning and end points that correspond to this record. |
| Comment | User-defined annotation. |
| TopicSentence | Sentence which characterizes the content of the testimony within the beginning and end points that correspond to this record. |

© 1991 Robins Analytics, Inc.

In the preferred system, the fields which establish the length of the record, fromLine and toLine, are line numbers generated by the system which correspond to specific page and line numbers in the transcript or other document. The system preferably converts a page and line number in the transcript to a single line number by knowing the value of the linesPerPage field in the Transcript Information File 106. For example, if the transcript has 25 lines per page, and line number 4 on page 3 is the beginning of the record, this point will be converted in the preferred system to 54 (fromLine=(25 lines/page×2 pages)+4). Manipulation and management of the records is facilitated by using single numbers to define the limits of a record, as opposed to two numbers (page and line) for each limit.

The comment field contains a user-defined annotation which may be any textual data. For example, the user may enter a note which reminds the user to take additional testimony from this witness on a particular topic.

C. Topics Files

The Topics File 104 contains a list of topics, one record for each topic. The topics may be subjects which characterize either a particular segment of the source text or items identified in the source text. In order to characterize a portion of the source text with a topic, the topics may be linked to a record in the Digest Records File 111 via the Topic Reference File 107. Topics may also be linked to an exhibit (item) via the TopicToExhibit Reference File 105.

The present system may also create subtopics for the model. A subset of master topics, or simply topics, consisting of one or more of the topics, would typically be used with any transcript for a particular case, whereas a set of subtopics would be grouped with one particular topic.

The fields of each record in the Topics File 104 may be defined as shown in Table 7.

TABLE 7

| FIELD | MEANING |
|---|---|
| topic | Name of the topic. |
| ID | Identification number for this record. |
| superTopicID | If this record is a subtopic, superTopicID is the identification number of the record for the topic associated with this subtopic. Otherwise, if this record is a master topic, superTopicID is zero. |

© 1991 Robins Analytics, Inc.

The fields of each record in the Topic Reference File 107 may be defined as shown in Table 8.

TABLE 8

| FIELD | MEANING |
|---|---|
| topicID | Identification number for the record containing a topic to be associated with a record in the Digest Records File. |
| digestRecordID | Identification number for the corresponding record in the Digest Records File. |

© 1991 Robins Analytics, Inc.

As shown in Table 8, the Topic Reference File 107 creates a link between a topic record and a record in the Digest Records File. Since each topic may be linked to more than one record in the Digest Records File, the Topic Reference File 107 may create a one-to-many association between a particular topic and multiple records by having a series of records with the same topic record identification number and different identification numbers of records in the Digest Records File.

The fields of each record in the TopicToExhibit Reference File 105 may be defined as shown in Table 9.

TABLE 9

| FIELD | MEANING |
|---|---|
| topicID | Identification number for the record containing a topic to be associated with an exhibit record. |
| exhibitID | Identification number for the corresponding exhibit record. |

© 1991 Robins Analytics, Inc.

The model may likewise create a one-to-many association between a topic and multiple exhibits by creating a series of records in the TopicToExhibit Reference File 105 which contain the same topic record identification number and different exhibit record identification numbers.

D. Exhibits Files

The Exhibits File 103 contains a list of items referred to in the source text, typically one record for each item. The records in this file also contain user-entered information that characterizes the exhibit.

Exhibits may be linked to topics as described above. Since the exhibits are referred to in the text, the exhibits may be linked, via the Exhibit Reference File 108, to the record in the Digest Records File which corresponds to that portion of the source text referencing the exhibit. The system may also group exhibits into sets using the Exhibit Sets File 102.

The fields of each record in the Exhibit Sets File may be defined as shown in Table 10.

TABLE 10

| FIELD | MEANING |
|---|---|
| name | Name of the exhibit set in this record. |
| ID | Identification number for this record. |

© 1991 Robins Analytics, Inc.

The fields of each record in the Exhibits File 103 may be defined as shown in Table 11.

TABLE 11

| FIELD | MEANING |
|---|---|
| setID | Identification number of the corresponding exhibit set record to which this exhibit record belongs. |
| depictor | Description characterizing the exhibit. |
| exhibitTypeID | Identification number of corresponding exhibit type record. |
| addressee | Person to whom the exhibit in this record was addressed. |
| date | Date of the exhibit. |
| author | Author of the exhibit. |
| title | Title of the exhibit. |
| documentNumber | Bates number of the exhibit. |
| other | User-defined textual data. |
| ID | Identification number for this record. |

© 1991 Robins Analytics, Inc.

The fields of each record in the Exhibit Reference File 108 may be defined as shown in Table 12.

TABLE 12

| FIELD | MEANING |
|---|---|
| exhibitID | Identification number for the record containing an exhibit to be associated with a record in the Digest Records File. |
| digestRecordID | Identification number for the corresponding record in the Digest Records File. |
| line | Line number in the source text where the exhibit is referenced. |

© 1991 Robins Analytics, Inc.

Exhibits may also be linked to the Exhibit Types File 260 for characterizing an exhibit. For example, exhibits may be characterized as letters, memos, graphs, or any user-created category. The fields of each record in the Exhibit Types File 260 may be defined as shown in Table 13.

TABLE 13

| FIELD | MEANING |
|---|---|
| type | Type of exhibit. |
| ID | Identification number for this record. |

© 1991 Robins Analytics, Inc.

In the preferred system, the user may also group the exhibits according to user-defined classes. Whereas the Exhibit Sets File 102 would typically be used with predefined sets such as plaintiff's deposition exhibits, the Exhibit Class File 261 may be used to create userdefined groupings of exhibits. For example, a user may define a class as "documents authored by Smith," and this class could include documents from any exhibit set. Therefore, classes may also be used to group exhibits across multiple exhibit sets. The fields of each record in the Exhibit Class File 261 may be defined as shown in Table 14.

TABLE 14

| FIELD | MEANING |
| --- | --- |
| Class | User-defined classification of exhibits. |
| ID | Identification Number for this record. |

© 1991 Robins Analytics, Inc.

Exhibits may be grouped into a class by linking records in the Exhibits File with records in the Exhibit Class File. The Exhibit Class Reference File 262 establishes the associations between exhibits and classes. The fields of each record in the Exhibit Class Reference File 262 may be defined as shown in Table 15.

TABLE 15

| FIELD | MEANING |
| --- | --- |
| Exhibit Class ID | Identification number of an exhibit class. |
| Exhibit ID | Identification number for a record of an exhibit to be included in this exhibit class. |

© 1991 Robins Analytics, Inc.

E. Dates File

The Dates File 116 allows the user to characterize portions of the source text with one or more dates and times or periods of time, expressed as a range of dates or times. This date and time typically refers to the content of the source text. For example, if a witness testified that an event occurred on a certain date, the user could enter this date, and the model would associate this date with the record in the Digest Records File that corresponds to that portion of the witness' testimony in the transcript. By associating dates and times with the records in the Digest Records File, the system may sort and display records in the Digest Records File chronologically. The chronological presentation of data is very useful to a litigator, for example, in seeing how events progress over time.

The fields of each record in the Dates File 116 may be defined as shown in Table 16.

TABLE 16

| FIELD | MEANING |
| --- | --- |
| date1 | First date, or the beginning of a period indicated by a start date and end date, the date or period, as the case may be, characterizing a portion of the source text represented in a record in the Digest Records File. |
| time1 | Optional time for date1 or an unspecified date. |
| date2 | Optional second date representing the end date if a period was specified to characterize the portion of the source text represented in a record in the Digest Records File. |
| time2 | Optional time for date2 or an unspecified date. |
| digestRecordID | Identification number for the corresponding record in the |

TABLE 16-continued

| FIELD | MEANING |
| --- | --- |
| | Digest Records File. |

© 1991 Robins Analytics, Inc.

F. Reminders File

The Reminders File 117 allows the user to enter reminders, and the system may associate those reminders with a particular record in the Digest Records File via the Reminder Reference File 112. A reminder may be, for example, a note to the user that more work needs to be done on a particular record in the Digest Records File. The fields of each record in the Reminders File 117 may be defined as shown in Table 17.

TABLE 17

| FIELD | MEANING |
| --- | --- |
| reminder | Description of the reminder. |
| ID | Identification number for this record. |

© 1991 Robins Analytics, Inc.

The fields of each record in the Reminder Reference File 112 may be defined as shown in Table 18.

TABLE 18

| FIELD | MEANING |
| --- | --- |
| reminderID | Identification number for the record containing a reminder to be associated with a record in the Digest Records File. |
| digestRecordID | Identification number for the corresponding record in the Digest Records File. |

© 1991 Robins Analytics, Inc.

G. Priorities File

The Priorities File 119 allows the user to enter levels of priority, and the system may associate a level of priority with a particular record in the Digest Records File via the Priority Reference File 118. A priority may be, for example, a degree of importance of the information in the records in the Digest Records File, as determined by the user. The Priorities File 119 and Priority Reference File 118 allows the system to sort and search records in the Digest Records File by importance, which is a useful feature in assessing, for example, various portions of a witness' testimony. The fields of each record in the Priorities File 119 may be defined as shown in Table 19.

TABLE 19

| FIELD | MEANING |
| --- | --- |
| priority | Description of the priority. |
| ID | Identification number for this record. |

© 1991 Robins Analytics, Inc.

The fields of each record in the Priority Reference File 118 may be defined as shown in Table 20.

TABLE 20

| FIELD | MEANING |
| --- | --- |
| priorityID | Identification number for the record containing a priority to be associated with a record in the Digest Records File. |
| digestRecordID | Identification number for the corresponding record in the |

TABLE 20-continued

| FIELD | MEANING |
| --- | --- |
| | Digest Records File. |

© 1991 Robins Analytics, Inc.

H. Work Log/Users Files

The Work Log File 115 allows the system to maintain a listing of all work performed on a particular portion of the source text. This may include the name of the person who entered or summarized the text, the dates and times when they worked on the source text, and the duration of time spent working on the source text. This type of information may be useful when, for example, the time spent summarizing a deposition transcript is billed to a litigating attorney's client.

In the disclosed system, the Work Log File 115 works in combination with the Users File 114 to keep track of this information. Each user normally has only one record in the Users File 114. Furthermore, each user's record in the User's File 114 may be linked to several records in the Work Log File 115, since the user may work on multiple transcripts or have multiple work log entries. The fields of each record in the Users File 114 may be defined as shown in Table 21.

TABLE 21

| FIELD | MEANING |
| --- | --- |
| lastName | Last name of the user. |
| firstName | First name of the user. |
| ID | Identification number for this record. |

© 1991 Robins Analytics, Inc.

The fields of each record in the Work Log File 115 may be defined as shown in Table 22.

TABLE 22

| FIELD | MEANING |
| --- | --- |
| userID | Identification number for the corresponding record in the Users File 114 containing the name of the person who is working on the transcript. |
| event | Number indicating a particular user action. |
| where | Identification number indicating where the event occurred. |
| date | Date when the event occurred. |
| time | Time when the event occurred. |
| where2 | Identification number of further location information if required for an event. |

© 1991 Robins Analytics, Inc.

I. Transcripts File

The Transcripts File 110 is used for importing the source text from an ASCII file into the model. Along with the hard copy of a transcript, court reporters will usually provide a floppy disk of the transcript in ASCII format. The formatting, however, such as the number of lines per page, may vary among different court reporters. The Transcripts File 110 stores a converted version of the ASCII file.

A separate converter module in the system converts the ASCII file to a format compatible with the model so that all imported ASCII files are in the same format in the model. The converter module converts the ASCII file by the steps of: (1) parsing the source text; (2) assigning internal reference numbers to the lines of the source text; (3) refining the source text to remove, for example, blank lines; and (4) obtaining from a user the beginning and end page and line numbers of the source text.

The fields of each record in the Transcripts File 110 may be defined as shown in Table 23.

TABLE 23

| FIELD | MEANING |
| --- | --- |
| transcriptID | Identification number of the record in the Transcripts Information File 106 that corresponds with this source text record. |
| TranscriptText | The imported and converted ASCII text file. |

© 1991 Robins Analytics, Inc.

J. Files for Indexing Transcripts

Figure 22:
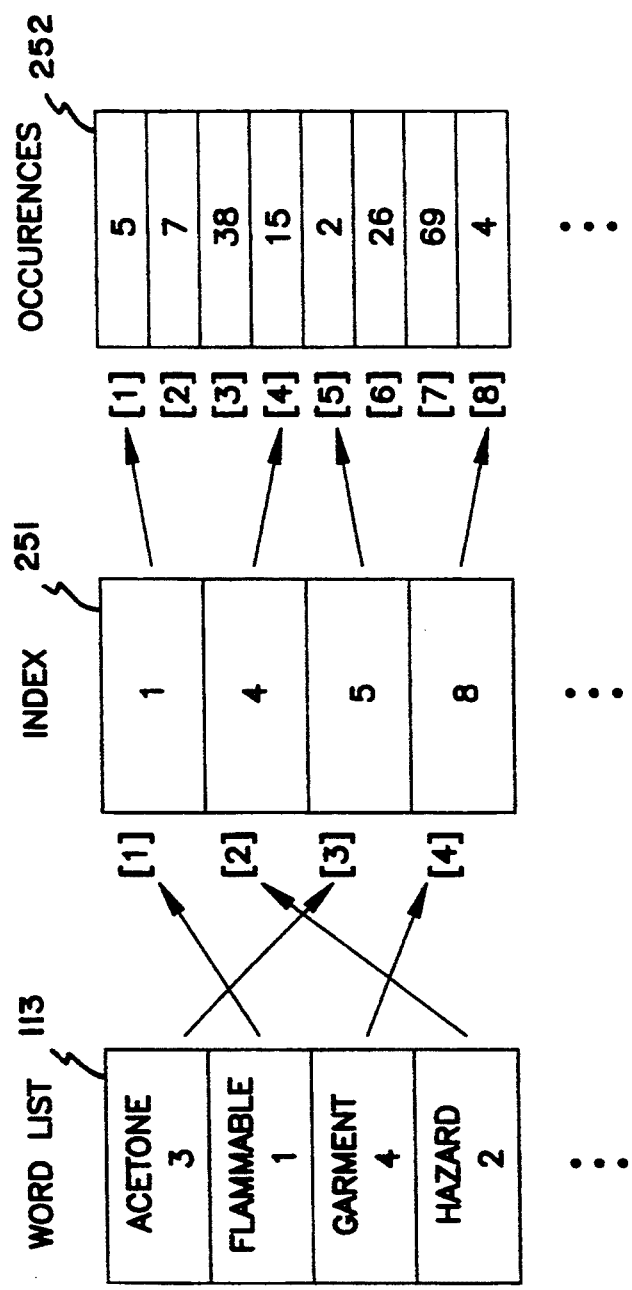
FIG. 22 is a block diagram showing a full-text indexing scheme.

FIG. 2C shows the files of the preferred relational database that are used for indexing the transcripts. These files include the WordList File 113, Indexes File 251, Occurrences File 252, and Transcripts File 253. FIG. 22 shows the interrelationship between these files for the indexing structure of the preferred database.

This indexing is used for full-text searching and reporting. Full-text indexing means that the system maintains an alphabetical list of every word in the source text and the corresponding locations of where those words occur in the source text. This type of index provides for a very fast and efficient method of searching imported source text for any word or combinations of words.

WordList File 113 contains a list of each unique word contained in all of the indexed transcripts in the model. Each word typically has a unique integer identification number. Preferably, there is only one word list for each case.

Indexes File 251 comprises one or more files, typically one file for each transcript that is indexed. In the preferred embodiment, each index contains a long integer entry for every word that is contained in the case at the time that the transcript is indexed, and each entry provides the offset to the occurrences of the particular word in the occurrences file for the transcript. The number of occurrences of a particular word may be obtained by subtracting the value at the word's location from the value at the next word's location in the index.

Occurrences File 252 comprises one or more files, normally one occurrence file for each transcript that is indexed. For every word contained in the transcripts, there are one or more integers contained in an occurrence file describing the locations of the word within the transcript.

Transcripts File 253 contains a file for each body of source text, for example, one file for each transcript that has been imported into the model.

III. MANAGEMENT AND ANALYSIS OF A MODEL

In the preferred embodiment, a model primarily comprises a series of records in the Digest Records File 111, which represents and characterizes the source text. The other files in the relational database of FIGS. 1A and 1B provide for associating other information with the records in the Digest Records File. For example, exhibits may be associated with any record in the Digest Records File, so that the system may track exhibits across multiple transcripts. Also, topics may be associated with any record in the Digest Records File, which allows for searching and sorting by a particular topic or grouping of topics. This feature is useful in litigation because it provides for analysis of the data contained in the records in the Digest Records File by issues of fact and law.

Figure 11:
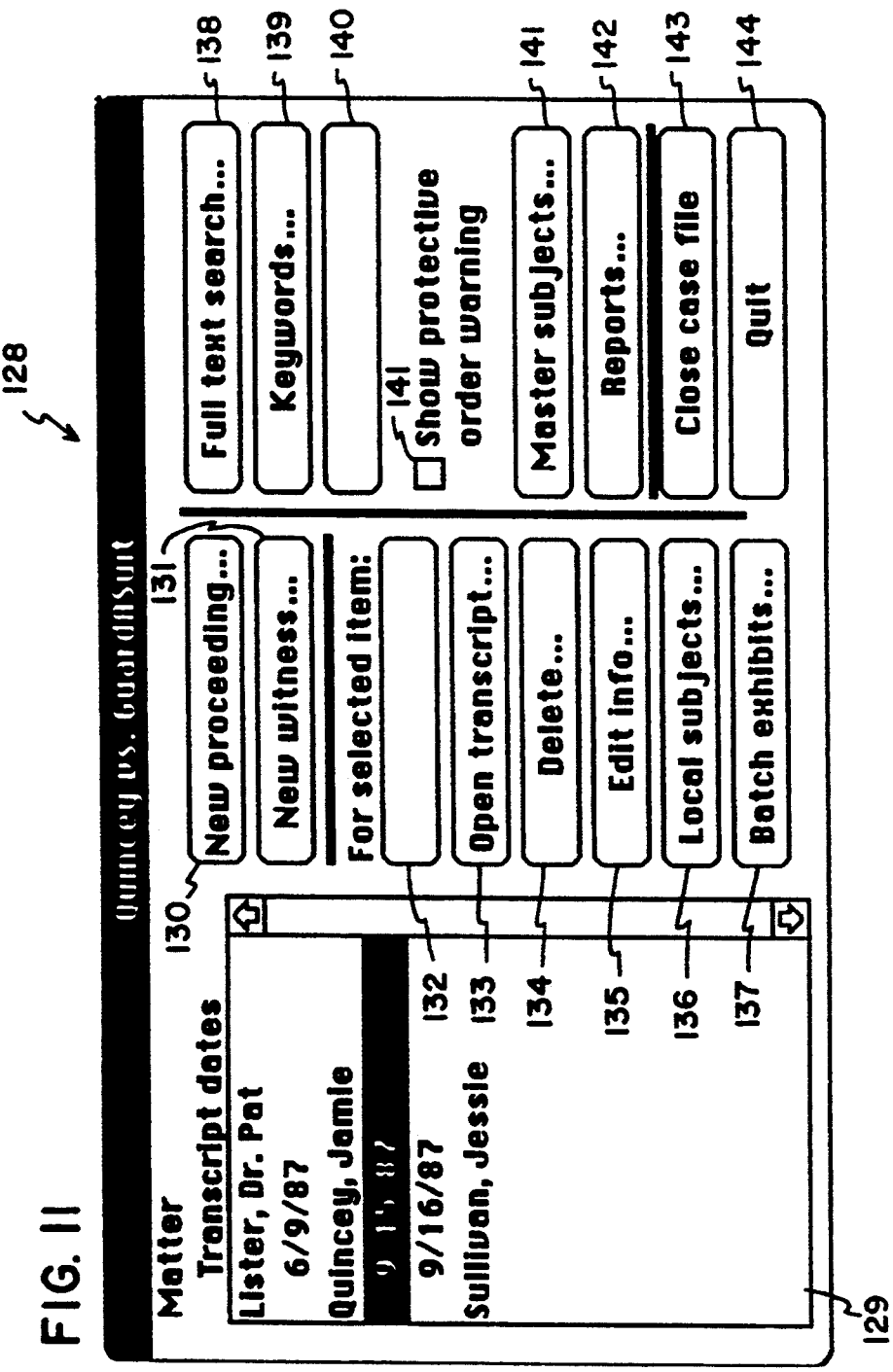
FIG. 11 represents a preferred user interface for accessing various systems of the disclosed embodiment.

The present system preferably operates using a graphical user interface. FIG. 11 shows a preferred user interface, dialog window 128, for accessing various modules of the system. Area 129 contains a listing of the source texts, which are identified by name and date. The date is used in conjunction with the name for identification purposes since, for example, one particular witness may have multiple transcripts of deposition testimony.

Dialog window 128 allows the user to execute the following functions of the system by selecting the corresponding button: add a new proceeding 130 or new witness 131 to the model; enter a new transcript 132; open the records in the Digest Records File of an existing transcript 133; delete a transcript 134; check the information (edit info. 135) that has been entered for a transcript in the Transcript Information File 106; enter local subjects 136; enter exhibits 137; perform a full-text search 138 of a transcript; enter keywords 139; index transcripts 140; enter a value 141 in the doWarning Field of the Cases File 100; enter master subjects 141; generate reports 142 from the model; close a case file 143; and exit the system 144.

Figure 12:
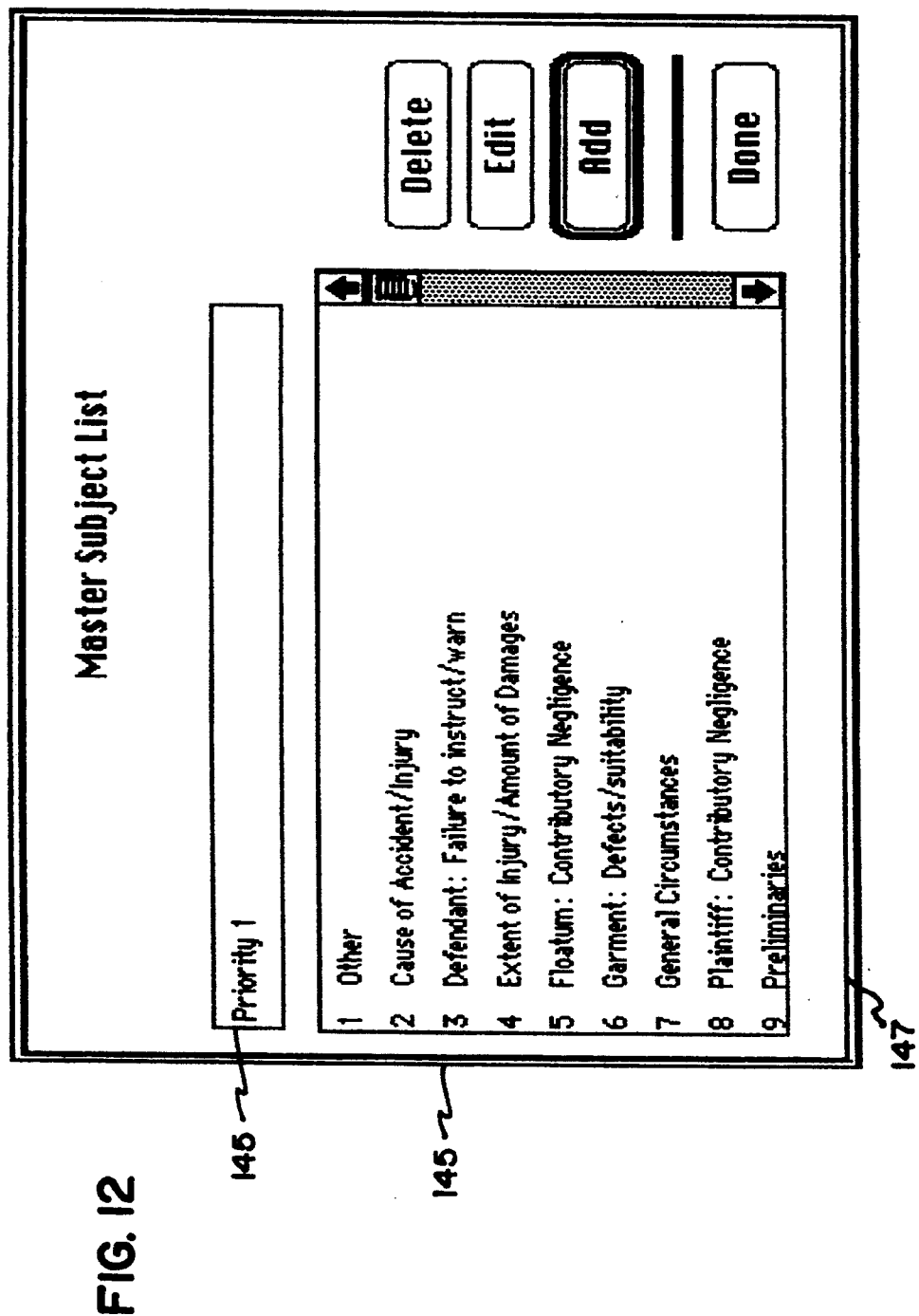
FIG. 12 represents a preferred user interface for entering topics into topic records.

A user would typically enter exhibits and topics before creating records in the Digest Records File. Therefore, when records in the Digest Records File are created, the user may associate topics and exhibits with records in the Digest Records File. Selecting the master subjects button 141 will bring up the preferred user interface for entering topics shown as dialog window 147 in FIG. 12. The user may enter topics or subjects in area 145. Area 146 displays the list of master subjects. Upon exiting from dialog window 147, the preferred system writes the new topics into the Topics File 104 and assigns a unique identification number to each topic.

Figure 13:
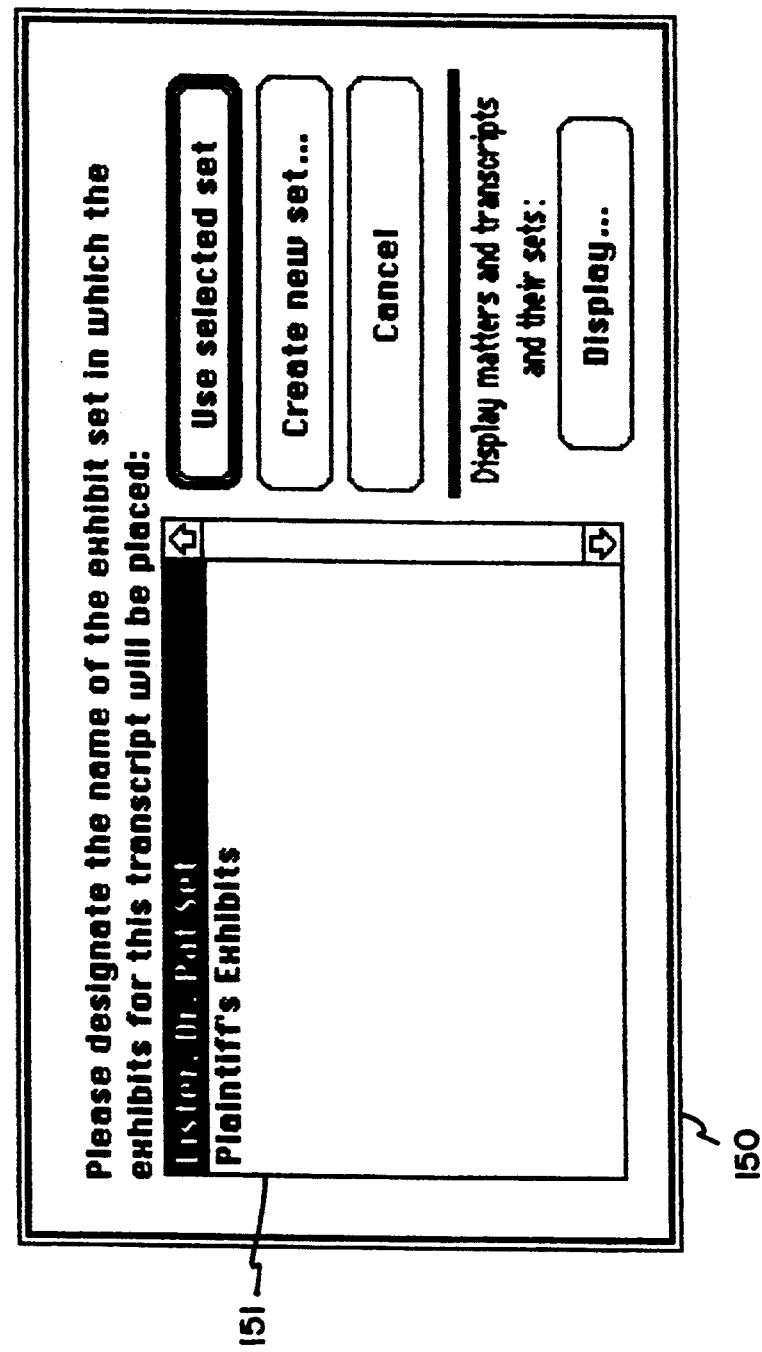
FIG. 13 represents a preferred user interface for creating an exhibit set record.

After a transcript has been created in the preferred system, a user may enter (batch) all or a portion of the exhibits for that transcript. Selecting the batch exhibits button 137 in the dialog window 128 brings up the preferred user interface for entering an exhibit set shown as dialog window 150 in FIG. 13. Area 151 contains a listing of the current exhibit sets for this model. The user may either use an existing set or enter a new exhibit set. If a user enters a new exhibit set, then the data for the new set is written to the Exhibit Sets File 102 upon exiting from dialog window 150.

Figure 14:
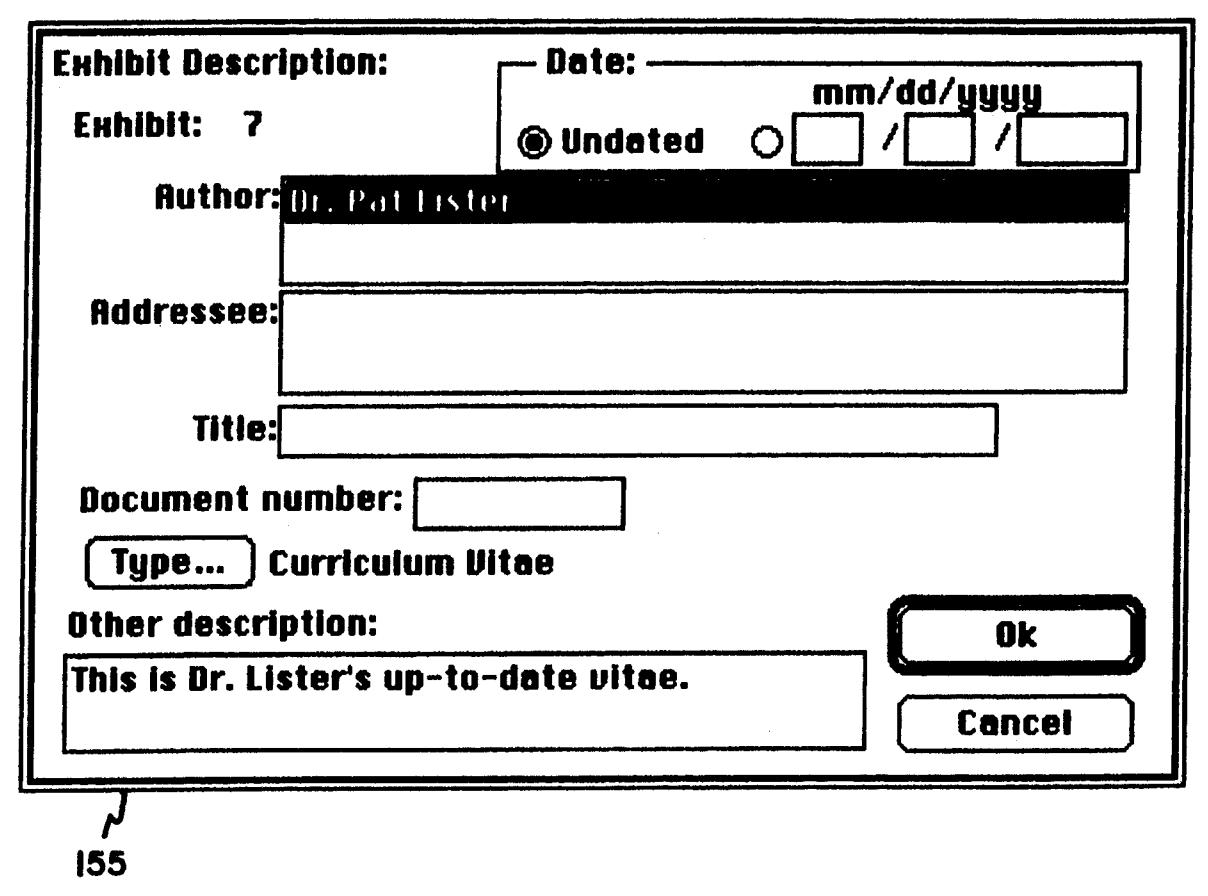

After selecting an exhibit set, the user will be taken to the preferred user interface for entering the exhibit depictor, and optionally exhibit information shown as dialog window 155 in FIG. 14. Dialog window 155 has several areas, each of which corresponds to a field in the Exhibits File 103. Upon entering each exhibit, the system writes the corresponding information for the exhibit to a new record in the Exhibits File 103 and generates a unique identification number for each exhibit record so that the Exhibits File 103 will contain a series of records, one record for each exhibit.

Figure 15:
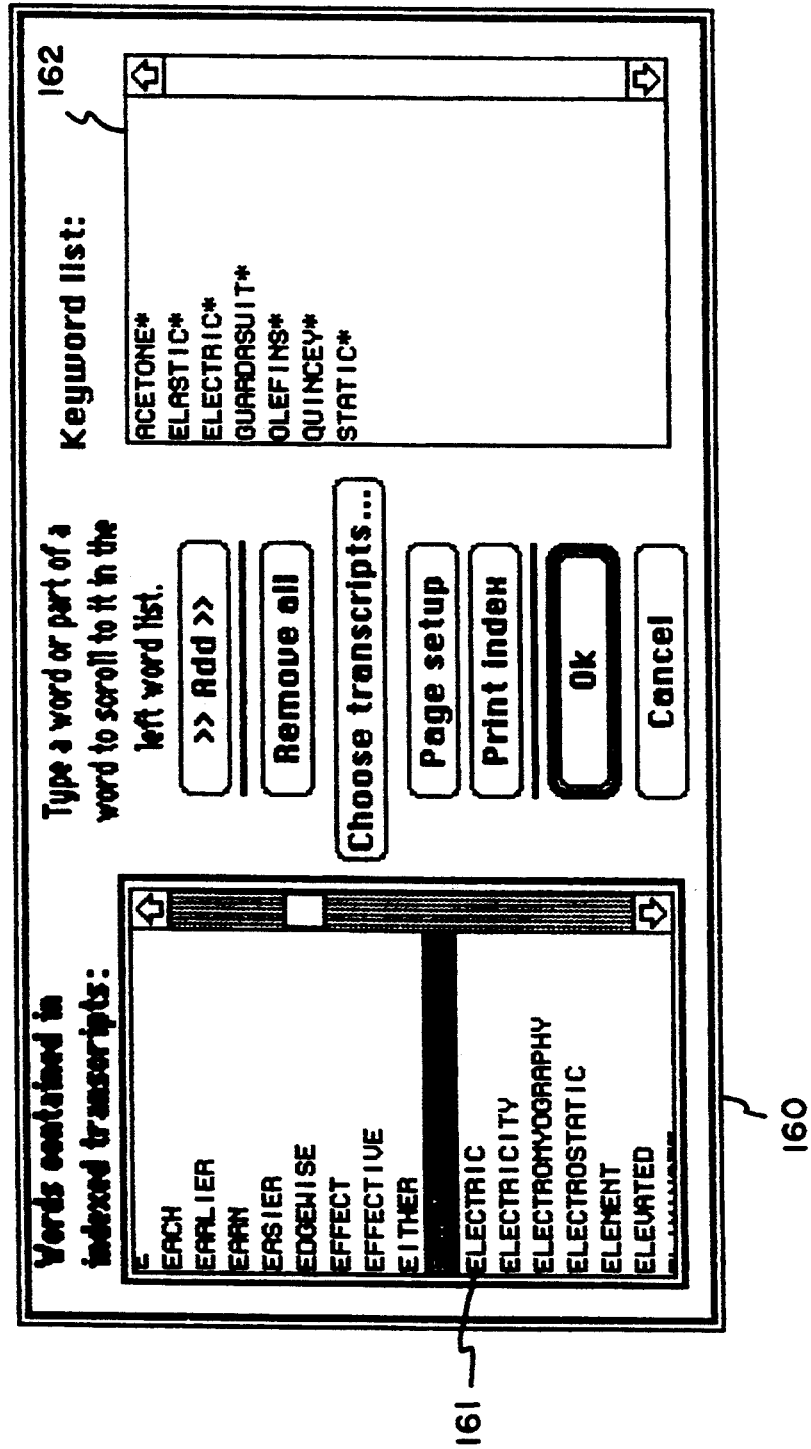
FIG. 15 represents a preferred user interface for creating a keyword list.

From the main dialog window 128, the user may also access dialog window 160 shown in FIG. 15 for entering keywords, also known as queries. Area 161 contains a list of all indexed words from the transcripts (source text). Area 162 contains a list of the words from area 161 that the user has selected to be keywords. Upon exiting dialog window 160, the preferred system writes the keywords to a file. The preferred system identifies the keywords by assigning a bit to each indexed word. One value of the bit, for example, a value of binary 1 indicates that the indexed work is a keyword, and a value of binary 0 indicates that the indexed word is not a keyword.

A. Creating a Record in the Digest Records File

The user creates records in the Digest Records File 111 by opening a new or current transcript from dialog window 128, which takes the user to the main window 170 shown in FIG. 16. Window 170 contains: area 174 for displaying the imported source text; area 172 for displaying topics and allowing the user to select topics; area 171 for entering digests which characterize a portion of the source text; area 175 for entering a topic sentence; and control area 173.

Control area 173 allows the user to establish the demarcation indicia for a record in the Digest Records File, enter comments, and make exhibit associations. In the preferred embodiment, a user establishes the length of a record by scrolling through the source text in area 174 and selecting the From button 176 and To button 177 at the desired beginning and end locations respectively of a record. The range of a record is defined by the user-entered beginning page and line number and end page and line number for a record in the Digest Records File. When a record is created in the relational database, the values in the From and To areas correspond to the fromLine and toLine Fields respectively of the Digest Records File 111.

In the preferred embodiment, the user may alternatively work with a hard copy of the transcript, i.e. without having the transcript on line in area 174 of main window 170. In this case, main window 170 would not contain area 174, and main window 170 would have a control area that allows a user to enter actual page and line numbers into the From and To fields. The values in the From and To fields are written to the FromLine and ToLine fields of Digest Records File 111 to create a record. Creating a representation of the source text by way of a model provides the unique advantage of allowing a user to work with only a hard copy of the source text. Aside from the user manually entering page and line numbers to establish the limits, of a record, all other functions of the control area would remain the same. The user may, among other things, enter a digest to characterize the source text, associate topics with records, enter exhibit references, and add annotations.

Figure 4:
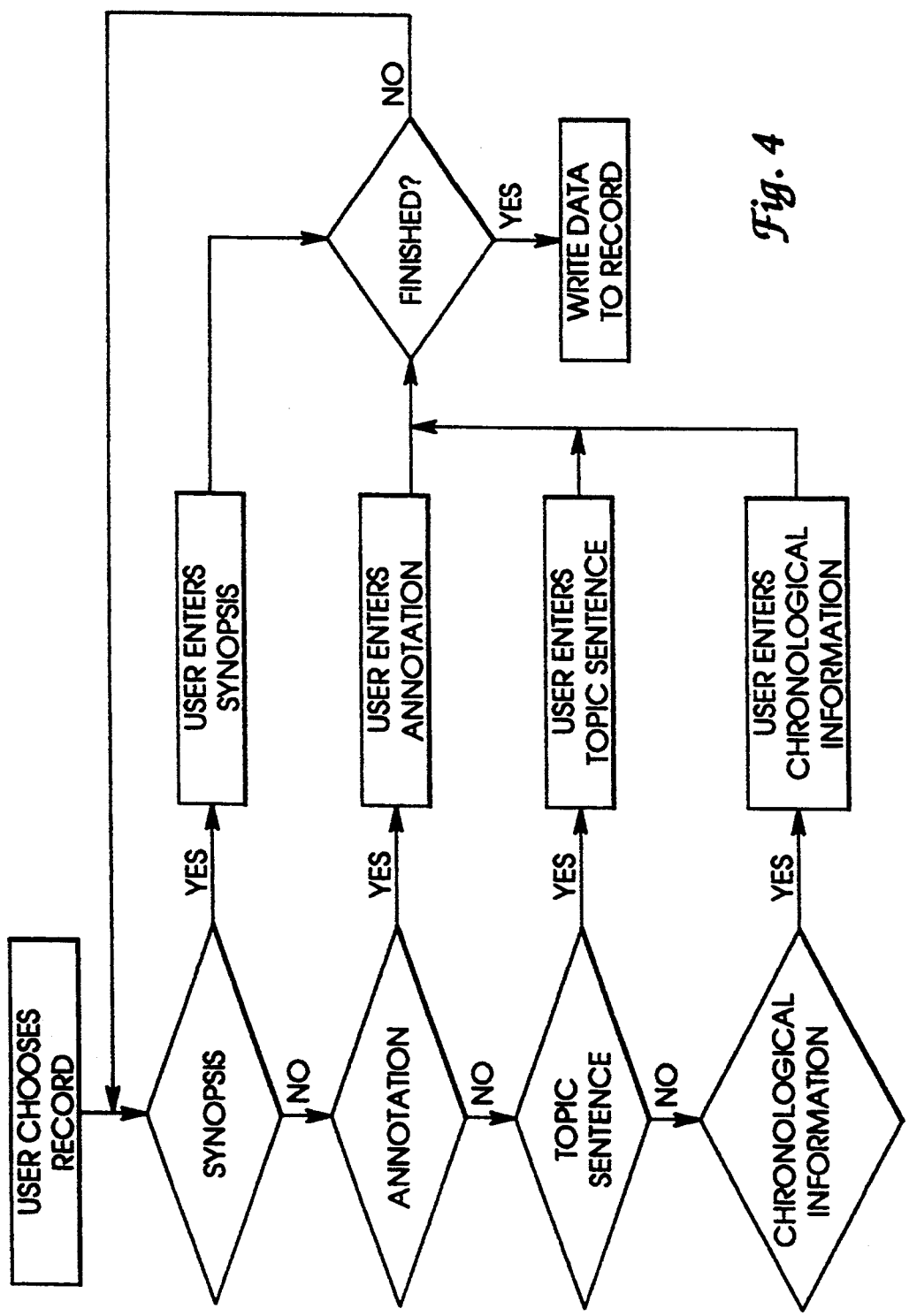
FIG. 4 represents a preferred flow of data through a process of creating a record in the Digest Records File.

FIG. 4 shows a preferred data flow for entering additional information into a record in the Digest Records File. The user enters a digest in area 171. The digest may be a summary of the content of the transcript within the limits established by the From and To indicators. The digest may also be actual portions of the source text which the user places in the digest area 171 by moving a portion of the source text from area 174 to area 171. The information in the digest area 171 is stored in the Digest Field of the Digest Records File 111.

Selecting the comments button 178 brings up a window (not shown) that allows the user to enter an annotation. The annotation is stored in the Comments Field of the Digest Records File 111. The annotations are linked to records in the Digest Records File as shown in FIG. 1. The annotation is typically in text. However, one skilled in the art will recognize that it is possible for the system to handle other forms of annotations, such as digitized voice.

Area 175 allows the user to enter a topic sentence which characterizes the content of the selected portion of the source text. The topic sentence is stored in the Topic Sentence Field of the Digest Records 111.

Selecting button 179 brings up a window (not shown) that allows the user to enter chronological information regarding the content of the selected portion of the source text. This chronological information is stored in the Dates File 116 and is linked to a record in the Digest. Records File as shown in FIG. 1. The chronological information may be, for example, dates and times of when events occurred according to the witness' testimony in the transcript.

Using main window 170, the user may also enter topic and exhibit references for a particular record. Since the preferred system operates in a windows environment, these associations, or any of the above information, may be entered in any order before the data and references are written to the relational database of FIG. 1. The preferred data flow for the writing the information for a record to the Digest Records File 111 is shown in FIG. 5.

B. Topic References

A user enters topic references in area 172. The user creates a reference by clicking the cursor on the topic that the user wants to reference to this record in the Digest Records File. When the user clicks on the topic, a check mark appears next to the topic to indicate that it has been selected.

Figure 5:
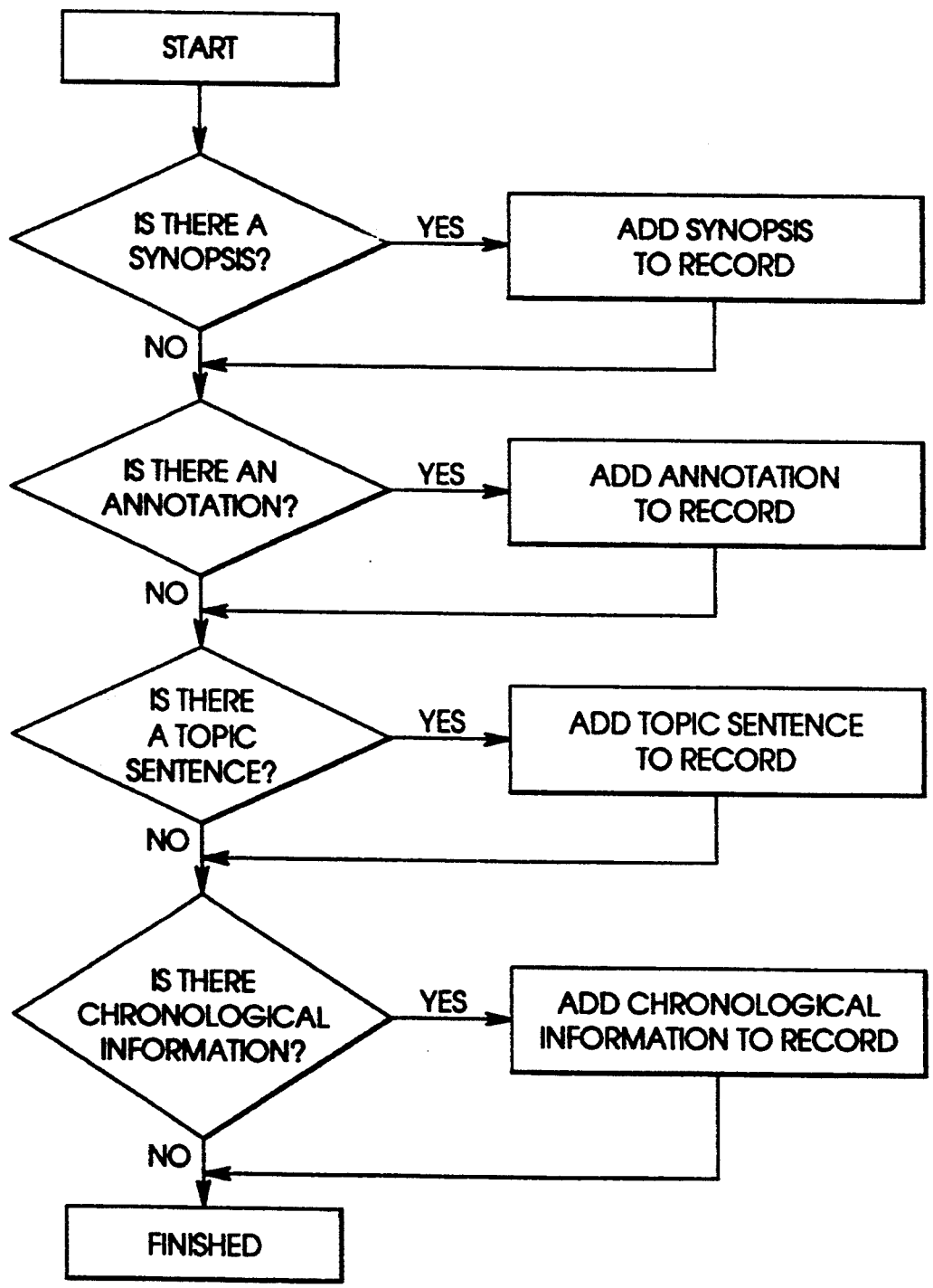
FIG. 5 represents a preferred flow of data through a process of relating a record in the Digest Records File to the preferred database compatible with the present invention.

When the system writes the digest information entered by the user to the database as shown in FIG. 5, the system looks for selected topics. The identification numbers for the selected topics are written into a series of records in the Topic Reference File 107 along with the identification numbers of the corresponding records in the Digest Records File. A series of records in the Topic Reference File 107 may generate one-to-many associations between topics and records in the Digest Records File, since one topic may be referenced to multiple records in the Digest Records File. This also means that changing a topic will affect all the records in the Digest Records File referenced to that topic in the Topic Reference File 107.

C. Exhibit References

Figure 6:
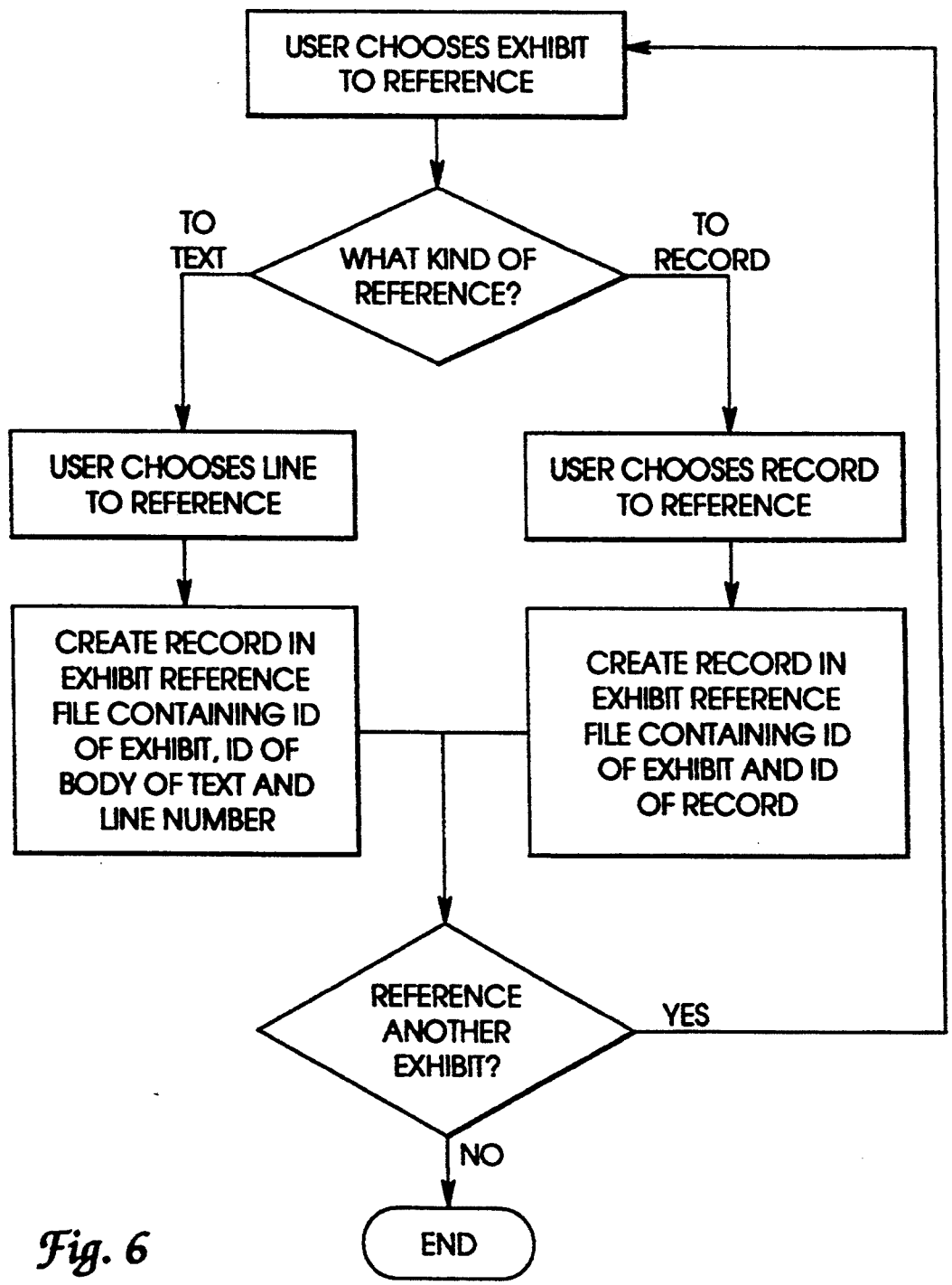
FIG. 6 represents a preferred flow of data through exhibit referencing to text and records in the Digest Records File.
Figure 17:
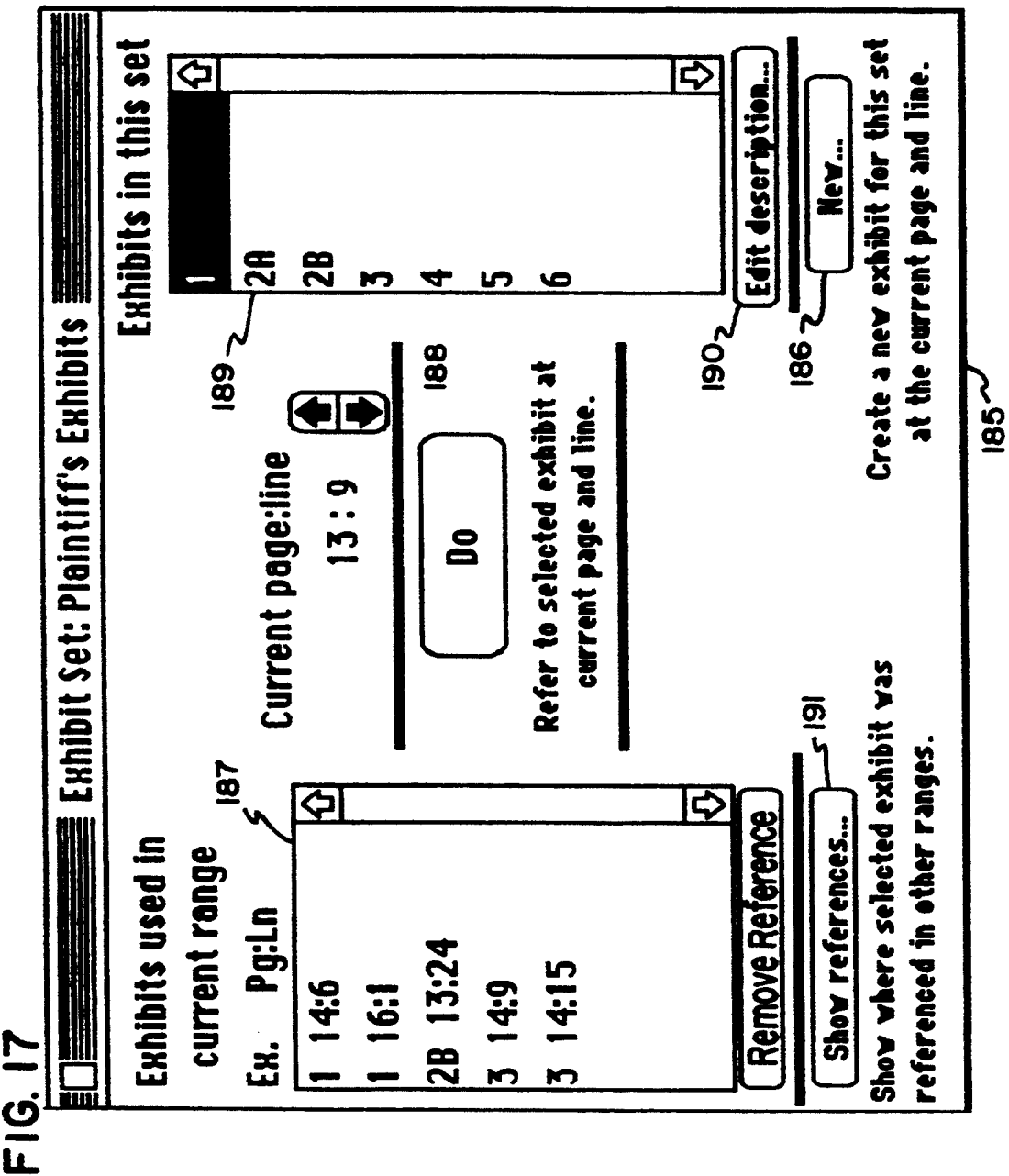
FIG. 17 represents a preferred user interface for creating an association between a record in the Digest Records File and an exhibit record.

In the preferred embodiment, selecting the exhibits area 180 in main window 170 brings up window 185 shown in FIG. 17, which allows the user to reference exhibits to the current record in the Digest Records File. The preferred data flow of the system for generating exhibit references in the model is shown in FIG. 6.

The user creates an exhibit reference by first selecting one of the exhibits displayed in area 189. Area 189 displays all the available exhibits in a particular set. Next, the user selects the Do button 188. The system then stores, in the Exhibit Reference File 108, the identification numbers for the selected exhibit and corresponding record in the Digest Records File. Exhibit Reference File 108 may contain multiple records for the same exhibit that references different records. This generates a one-to-many association between each exhibit and one or more records in the Digest Records File.

Area 187 displays the exhibits which have been referenced for the range of source text that corresponds to the length of the current record in the Digest Records File. The user may display exhibits that have been referenced for a different range by selecting the Show References button 191. Window 185 also allows the user to enter new exhibits by selecting the New button 186.

The user may edit the description of a particular exhibit by selecting the Edit Description Button 190.

D. Other Functions of Control Area 173

Control Area 173 in FIG. 16 has the following additional functions. Selecting button 205 moves the user to the previous record in the Digest Records File 111. Selecting button 206 moves the user to the next record in the Digest Records File. Selecting either button 205 or 206 initiates the process shown in FIG. 5 of creating a record in the Digest Records File 111 by writing the information entered by the user to a new record and assigning a unique identification number to that record.

The Check button 207 allows the user to verify whether the current range setting is valid, since the system does not allow the ranges of records in the Digest Records File to overlap.

Figure 18:
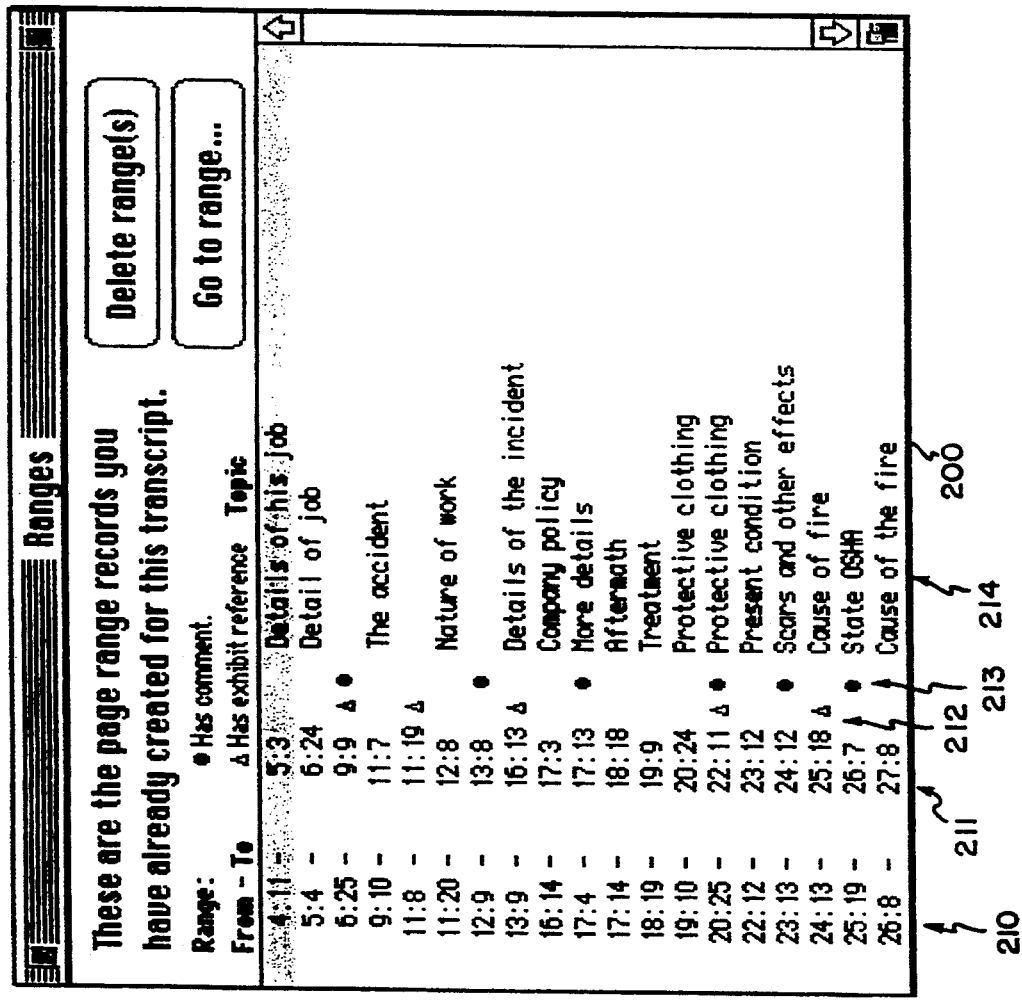
FIG. 18 is a report which represents the records in the Digest Records File and the associations of the records in the Digest Records File with other records.

Selecting the Ranges button 195 brings up a Ranges Window 200 shown in FIG. 18. Ranges Window 200 shows a listing that represents the records in the Digest Records File 111 for the current transcript. Column 210 shows the beginning page and line numbers for each record in the Digest Records File. Column 211 shows the end page and line numbers for each record in the Digest Records File. Column 212 indicates whether each record in the Digest Records File has exhibit references. Column 213 indicates whether a comment has been created for each record in the Digest Records File. Finally, column 214 displays the topic sentence for each record in the Digest Records File. The Ranges Window 200 is a concise and efficient method of displaying a representation of the records in the Digest Records File.

IV. GENERATING REPORTS FROM THE MODEL

The model of the present invention provides the system with a high degree of flexibility and versatility in generating reports from the model. The reports provide the user with powerful tools to assist in the analysis of the information contained within the source text. The system is capable of generating a variety of output reports which are explained below. The reporting options are accessed via buttons 138 and 142 on the dialog area 129 (see FIG. 11). The user has the option of having the system generate a report on a user interface, such as a monitor, or generating a hard copy of the report.

A. Full-Text Searching and Reporting

1. Word/Topic Searching

Figure 7:
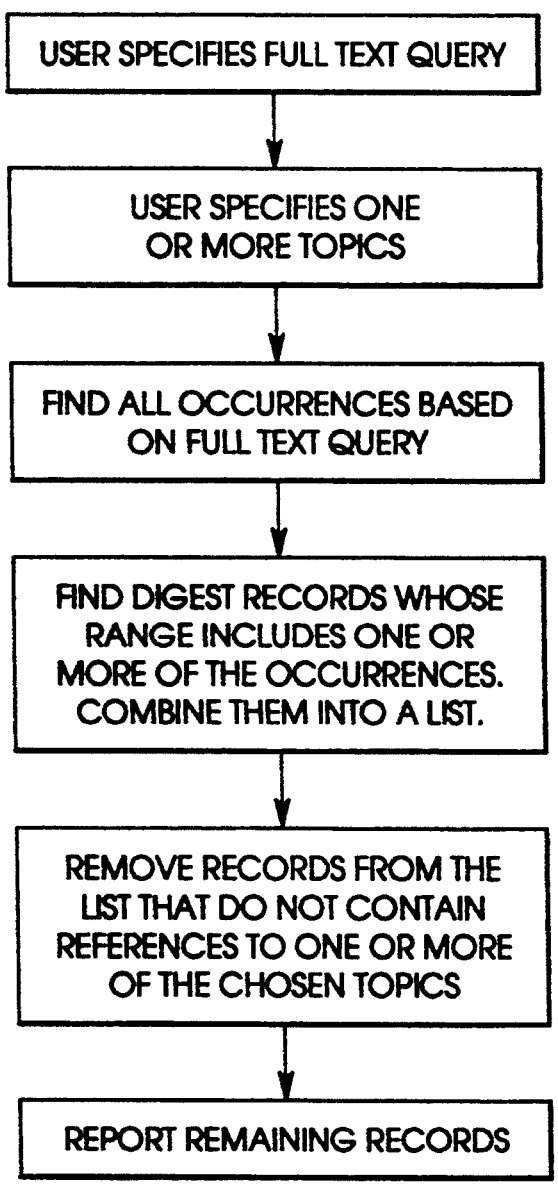
FIG. 7 represents a preferred flow of data through full-text searching and reporting.
Figure 19:
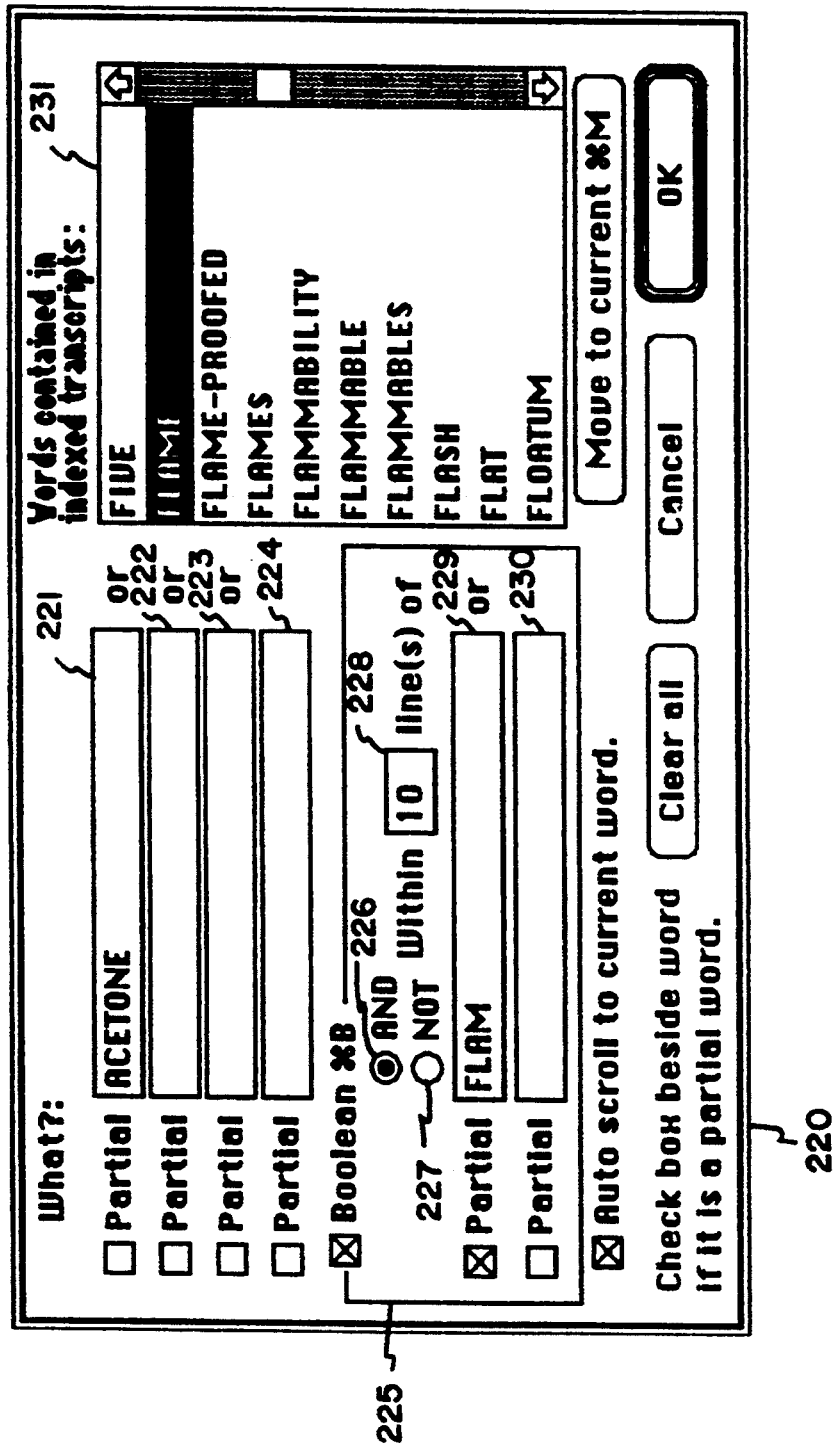
FIG. 19 represents a preferred user interface for generating a report.

Selecting the Full-Text Search button 138 brings up the Full-Text Search Dialog Window 220 shown in FIG. 19. Dialog window 220 contains areas that allow the user to generate various reports through searching all words contained within one or more transcripts. Areas 221–224 allow the user to enter words to search. Area 231 displays a list of all words in indexed transcripts contained within the case. This shows the user if the user-selected search word is actually contained within the case and is a convenient feature for increasing the efficiency of generating reports. FIG. 7 shows the preferred flow of data for performing a full-text search based upon the terms or topics in areas 221–224.

2. Queries

Area 225 allows the user to perform searches in a user-selected search domain, optionally combining user-selected search terms in areas 221–224 in a Boolean logical relationship with user-selected search terms in areas 229–230. The query may also optionally be confined to a character string alone (whole word) or as part of another string (partial word). The search domains are: source text (transcript); comments; digests; and topic sentences. The Boolean logical operators available for searching are as follows: OR function using areas 221–224; AND function using area 226; NOT function using area 227. The preferred system performs Boolean searching according to the pseudo code representation Shown in Table 24.

TABLE 24 pseudo code for Boolean full-text search

Find all occurrences of first word within the
chosen search domain and store them in a list,
wordOneOccurrences.
Find all occurrences of second word within the
chosen search domain and store them in a list,
wordTwoOccurrences.
FOR each occurrence in wordOneOccurrences DO
    FOR each occurrence in wordTwoOccurrences DO
        IF the combination of the first word
        occurrence and the second word occurrence
        satisfy the chosen Boolean query
        THEN
        add a representation of the two occurrences
        to a list of occurrences maintained for this
        query, queryResults.

© 1991 Robins Analytics, Inc.

3. Context Searching

Figure 8:
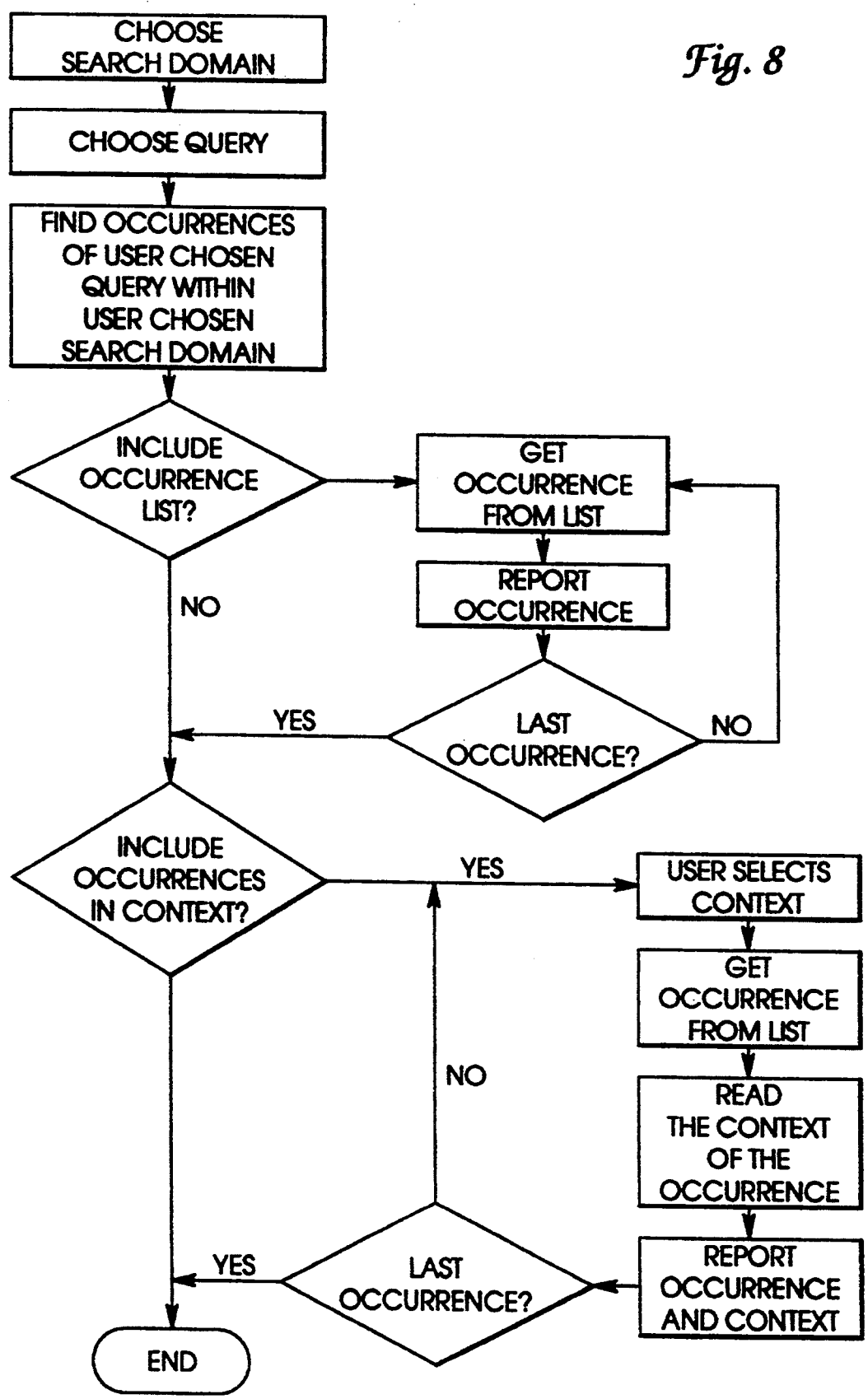
FIG. 8 represents a preferred flow of data through searching and reporting of a search domain.

A context search is available using area 228 (see FIG. 19). The context is a user-defined integer value, and the system performs a full-text context search by searching for one or more terms within the context of one or more other terms in the user-selected search domains described above. In the preferred embodiment, the context is a user-defined number of lines in the transcript. FIG. 8 shows the preferred flow of data for performing a full-text context search and generating a report. FIG. 20 shows an example of full-text search report, showing the results of searching all the source texts for the whole word "acetone" within five words of the partial word "flam."

C. Reporting From Selected Fields

Figure 9:
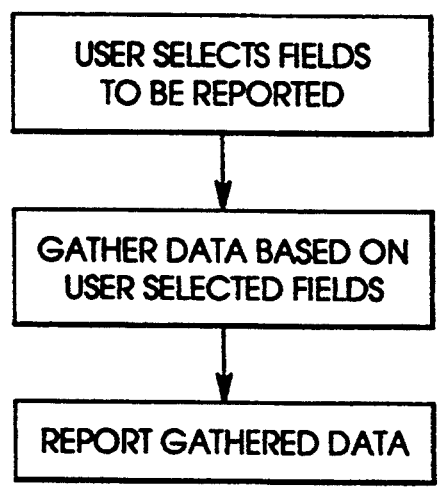
FIG. 9 represents a preferred flow of data through reporting selected fields of records in the Digest Records File.

The preferred system has the capability to report information in the model from user-selected fields in various files of the relational database of FIG. 1. The preferred user interface for generating reports from user-selected fields is shown as dialog window 235 in FIG. 21. Area 240 displays the source text files from which the system may generate the reports. The user may select one or more of the source text files. Area 241 allows the user to select one more fields from which to report information contained within the files of the relational database. FIG. 9 is a preferred flow of data through the system for generating these reports.

D. Graphical Reports of Database Relations

Figure 10:
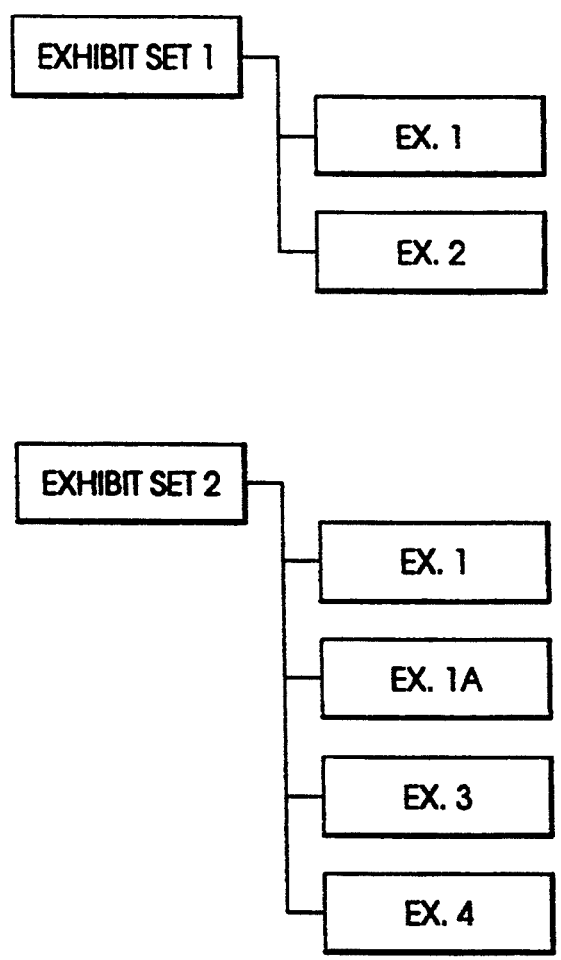
FIG. 10 represents a graphical illustration of a database relationship.

The system also has the capability to generate a graphical report that shows the relations between files in the database. For example, as shown in FIG. 10, the system may generate a report that shows a graphical relationship between each exhibit set in the Exhibit Sets File 102 and all records in the Exhibits File 103 which are linked to the exhibit sets.

While the present invention has been described in connection with the preferred embodiment thereof, it will be understood that many modifications will be readily apparent to those skilled in the art, and this application is intended to cover any adaptations or variations thereof. For example, while the preferred embodiment has been shown to operate on deposition and court proceeding transcripts, the present invention may be used for all types of textual works, including but not limited to, books, periodicals, magazines, documentation of scientific research, and multivolume works. Likewise, the preferred embodiment of the present invention is shown as operating from a Pascal implementation on a Macintosh hardware platform. One skilled in the art will recognize that other programming or hardware environments may be used without departing from the scope of the invention.

It is manifestly intended that this invention be limited only by the claims and equivalents thereof.

What is claimed is:

1. A computer-based information analysis system for creating a representation of at least a portion of at least one of first and second predetermined bodies of text, the representation comprising records which correspond to text segments each of which have a length determined by the system user, the system comprising:

a) input means for entering data, the input means comprising topic input means for inputting a set of user-defined topics;

b) organization means for structuring the representation, the organization means comprising:

i) record division means for creating at least one of first and second sets of records, wherein each set of records corresponds to a particular body of text and wherein each record comprises data which characterizes a particular text segment chosen by a system user, the record division means comprising demarcation indicia means for entering demarcation indicia representing the user selected length of each record;

ii) one-to-one association organizing means comprising demarcation indicia association means for establishing a one-to-one association between a predetermined record and the corresponding demarcation indicia for indicating the length of the record; and iii) one-to-many association organizing means comprising topic organizing means for establishing a user-designated one-to-many association between at least one user-defined topic and at least one of the records; and c) output means for generating a report.

2. The system of claim 1 wherein:

a) the input means further comprises annotation input means for inputting one or more user-defined annotations to the text;

b) the one-to-one association organizing means further comprises annotation organizing means for establishing a one-to-one association between each annotation and a corresponding record; and ( c) the output means further comprises record retrieval means for retrieving one or more records according to one or more annotations associated with at least one record.

3. The system of claim 2 wherein the output means further comprises:

a) text search and retrieval query means for locating each occurrence of a string of characters in the annotations; and b) text search and retrieval report means comprising:

i) occurrence report means for listing the location in the annotations of all occurrences of the string of characters; and ii) context report means for reporting each string of characters as it occurs in a range of surrounding text of a size determined by a user.

4. The system of claim 3 wherein the text search and retrieval query means further comprises Boolean query means for enabling a user to formulate a query comprising at least one character string optionally in Boolean relation to at least one condition of conjunctive or disjunctive or negative proximity to another character string.

5. The system of claim 2 wherein:
   a) the input means further comprises annotation input means for inputting user-defined annotations selected from the group consisting of text, symbols, digitized pictorial material, digitized voice, or a binary representation of analog information; and
   b) the organizing means further comprises annotation organizing means for organizing annotations into at least one of first and second sets classified according to type of annotation.

6. The system of claim 1 wherein:
   a) the input means further comprises synopsis input means for inputting at least one of first and second sets of user-created synopses of the text; and
   b) the one-to-one association organizing means further comprises synopsis organizing means for establishing a one-to-one association between each synopsis and a corresponding record.

7. The system of claim 6 wherein the output means further comprises:
   a) text search and retrieval query means for locating each occurrence of a string of characters in at least one of the first and second sets of synopses; and
   b) text search and retrieval report means comprising:
      i) occurrence report means for listing the location in at least one of the first and second sets of synopses of all occurrences of the string of characters; and
      ii) context report means for reporting each string of characters as it occurs in a range of surrounding text of a size determined by a user.

8. The system of claim 7 wherein the text search and retrieval query means further comprises Boolean query means for enabling a user to formulate a query comprising at least one character string optionally in Boolean relation to at least one condition of conjunctive or disjunctive or negative proximity to another character string.

9. The system of claim 1 wherein:
   a) the input means further comprises descriptive sentence input means for inputting one or more sentences corresponding to the synopses for describing the content of the synopsis in abstract form;
   b) the one-to-one association organizing means further comprises descriptive sentence organizing means for establishing a one-to-one association between each descriptive sentence and a corresponding record; and (
   c) the output means further comprises record retrieval means for retrieving one or more records according to one or more of the descriptive sentences associated with at least one record.

10. The system of claim 9 wherein the output means further comprises:
    a) text search and retrieval query means for locating each occurrence of a string of characters in the descriptive sentences; and
    b) text search and retrieval report means comprising:
       i) occurrence report means for listing the location in the descriptive sentences of all occurrences of the string of characters; and
       ii) context report means for reporting each string of characters as it occurs in a range of surrounding text of a size determined by a user.

11. The system of claim 10 wherein the text search and retrieval query means further comprises Boolean query means for enabling a user to formulate a query comprising at least one character string optionally in Boolean relation to at least one condition of conjunctive or disjunctive or negative proximity to another character string.

12. The system of claim 1 wherein:
    a) the input means further comprises item-identifier input means for inputting at least one of first and second sets of item-identifiers corresponding to items comprehended by the text;
    b) the one-to-many association organizing means further comprises item-identifier association means for establishing a one-to-many association between each item-identifier and the corresponding records which comprehend a reference to the respective item; and
    (c) the output means further comprises record retrieval means for retrieving one or more records according to one or more of the item identifiers corresponding to items comprehended by the text, and associated with at least one of the records.

13. The system of claim 12 wherein:
    a) the input means further comprises item depictor means for inputting item depictors describing items comprehended by the text;
    b) the one-to-one association organizing means further comprises item depictor one-to-one association organizing means for establishing a one-to-one association between each item depictor and a corresponding item-identifier; and
    (c) the output means further comprises record retrieval means for retrieving one or more records according to one or more of the item depictors describing items comprehended by the text, and associated with at least one of the records.

14. The system of claim 12 wherein the organizing means further comprises item class organizing means for organizing the item-identifiers into at least one of first and second sets classified according to a userdefined class of item.

15. The system of claim 12 wherein the organizing means further comprises item reference organizing means for organizing item-identifiers into at least one of first and second sets classified according to a user-defined type of item.

16. The system of claim 1 wherein the output means further comprises:
    a) text search and retrieval query means for locating each occurrence of a string of characters in at least one of the first and second bodies of text; and
    b) text search and retrieval report means comprising:
       i) occurrence report means for listing the location in at least one of the first and second bodies of text of all occurrences of the string of characters; and
       ii) context report means for reporting each string of characters as it occurs in a range of surrounding text of a size determined by a user.

17. The system of claim 16 wherein the text search and retrieval query means further comprises Boolean query means for enabling a user to formulate a query comprising at least one character string optionally in Boolean relation to at least one condition of conjunctive or disjunctive or negative proximity to another character string.

18. The system of claim 16 wherein:
   a) the text search and retrieval query means further comprises topic query means for enabling a user to define queries to text occurring in records previously associated with at least one topic; and
   b) the text search and retrieval report means further comprises record report means for reporting each record in which the string occurs.

19. The system of claim 1 wherein:
   a) the input means further comprises:
      i) item-identifier input means for inputting at least one of first and second sets of item-identifiers corresponding to items referenced by the text; and
      ii) item-location indicium input means for inputting at least one of first and second sets of item location indicia wherein each indicium serves to demarcate the location in the text of a reference in the text to an item;
   b) the one-to-many association organizing means further comprises means for establishing a one-to-many association between each item-identifier and all item-location indicia for the same item; and
   c) the output means further comprises record retrieval means for retrieving one or more records according to one or more of the item identifiers corresponding to items references by the text, and associated with at least one of the records.

20. The system of claim 19 wherein the one-to-one association organizing means comprises item-location indicium organizing means for establishing a one-to-one association between each item-location indicium and the corresponding record which comprehends a reference to the respective item.

21. The system of claim 1 wherein:
   a) the input means further comprises:
      i) item-identifier input means for inputting at least one of first and second sets of item-identifiers corresponding to items located in the text; and
      ii) item-location indicium input means for inputting at least one of first and second sets of item location indicia wherein each indicium serves to demarcate the location in the text of the items located in the text;
   b) the one-to-many association organizing means further comprises means for establishing a one-to-many association between each item-identifier and all item-location indicia for the same item; and
   c) the output means further comprises record retrieval means for retrieving one or more records according to one or more of the item identifiers corresponding to items located in the text, and associated with at least one of the records.

22. The system of claim 21 wherein the one-to-one association organizing means comprises item-location indicium organizing means for establishing a one-to-one association between each item-location indicium and the corresponding record which comprehends a reference to the respective item.

23. The system of claim 1 wherein each record corresponds to a unique portion of the text.

24. The system of claim 1 wherein:
   a) the input means further comprises date input means for inputting one or more user-determined dates associated with at least one of the records;
   b) the one-to-one association organizing means further comprises date organizing means for establishing a one-to-one association between each date and a corresponding record; and
   (c) the output means further comprises record retrieval means for retrieving one or more records according to one or more dates associated with at least one record.

25. The system of claim 1 wherein
   (a) the input means further comprises time input means for inputting a user-determined time associated with at least one of the records; and
   (b) the output means further comprises record retrieval means for retrieving one or more records according to one or more times associated with at least one record.

26. The system of claim 1 wherein:
   (a) the input means further comprises time period input means for inputting a user-defined range of dates associated with at least one of the records; and
   (b) the output means further comprises record retrieval means for retrieving one or more records according to one or more ranges of dates associated with at least one record.

27. The system of claim 1 wherein:
   (a) the input means further comprises time period input means for inputting a user-defined range of times associated with at least one of the records; and
   (b) the output means further comprises record retrieval means for retrieving one or more records according to one or more ranges of times associated with at least one record.

28. The system of claim 1 wherein:
   a) the topic input means further comprises subtopic input means for inputting one or more sets of user-defined subtopics wherein each set of subtopics comprises a subset of a set of topics;
   b) the organizing means further comprises subtopic one-to-many organizing means for establishing a userdesignated one-to-many association between at least one of the user-defined subtopics and at least one of the records; and
   (c) the output means further comprises record retrieval means for retrieving one or more records according to one or more of the user-defined subtopics associated with at least one record.

29. The system of claim 1 wherein:
   a) the input means further comprises priority input means for enabling a user to input indicia of user-defined priority of degree of importance of at least one of the records;
   b) the organizing means further comprises priority organizing means for establishing a user-designated association between an indicium of priority and at least one of the records; and
   (c) the output means further comprises record retrieval means for retrieving one or more records according to one or more of the user-defined indicia of priority associated with at least one record.

30. The system of claim 1 wherein:
   a) the input means further comprises reminder input means to enable a user to input user-defined reminders;

b) the organizing means further comprises reminder organizing means for establishing a user-designated association between the user-defined reminders and at least one of the records; and (c) the output means further comprises record retrieval means for retrieving one or more records according to one or more of the user-defined reminders associated with at least one record.

31. The system of claim 1 wherein:

a) the organizing means further comprises query organizing means for storing a list of one or more user-defined queries; and b) the output means further comprises query report means for generating a report of all locations of one or more of the queries in at least one of the first and second bodies of text.

32. The system of claim 1 wherein the output means comprises data report means for reporting user-selectable portions of the data contained in the records.

33. The system of claim 1 wherein the output means comprises relational report means for graphically reporting:

a) at least one of the one-to-one associations; and b) at least one of the one-to-many associations.

34. The system of claim 1 wherein the output means comprises sorting means for arranging in alpha-numeric and chronological order, as appropriate, data from each of the records to be included in the report.

35. The system of claim 1 wherein:

a) the input means further comprises converter input means for converting the text of at least one of the first and second predetermined bodies of text into a series of numbered lines, the converter input means comprising:

i) converter input test means for testing whether the format of text to be converted comprehends adequate location indicia so that no further indicia will be required by the user; and ii) reference copy converter means for superimposing reference page numbers or reference page and line numbers on the converted text in the event the format of the converted text does not comprehend adequate location indicia; and b) the organizing means further comprises reference copy organizing means for establishing a one-to-one association between the reference page numbers or reference page and line numbers of the converted text and corresponding location indicia in the text of at least one of the first or second predetermined bodies of text.

36. The system of claim 1 wherein the output means further comprises record retrieval means for retrieving one or more records according to one or more of the user-defined topics associated with at least one of the records.

* * * * *